US010079390B2

(12) United States Patent
Matsuno et al.

(10) Patent No.: US 10,079,390 B2
(45) Date of Patent: Sep. 18, 2018

(54) SECONDARY BATTERY, BATTERY PACK, AND VEHICLE

(71) Applicant: KABUSHIKI KAISHA TOSHIBA, Minato-ku (JP)

(72) Inventors: Shinsuke Matsuno, Tokyo (JP); Norio Takami, Yokohama (JP); Yasunobu Yamashita, Tokyo (JP); Hiroki Inagaki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 59 days.

(21) Appl. No.: 15/457,167

(22) Filed: Mar. 13, 2017

(65) Prior Publication Data

US 2017/0271682 A1    Sep. 21, 2017

(30) Foreign Application Priority Data

Mar. 16, 2016    (JP) .................................. 2016-052688

(51) Int. Cl.
*H01M 4/66*    (2006.01)
*H01M 4/485*    (2010.01)
(Continued)

(52) U.S. Cl.
CPC ............... *H01M 4/661* (2013.01); *B60L 7/16* (2013.01); *B60L 11/18* (2013.01);
(Continued)

(58) Field of Classification Search
CPC combination set(s) only.
See application file for complete search history.

(56) References Cited

U.S. PATENT DOCUMENTS

2009/0087742 A1    4/2009   Martinet et al.
2010/0092857 A1*   4/2010   Phillips ................. H01M 4/244
                                                      429/164
(Continued)

FOREIGN PATENT DOCUMENTS

EP    2 980 888 A1    2/2016
JP    9-508490        8/1997
(Continued)

OTHER PUBLICATIONS

S. Liu, et al. "Rechargeable Aqueous Lithium-Ion Battery of $TiO_2$/$LiMn_2O_4$ with a High Voltage", Journal of The Electrochemical Society, 158 (12), 2011, 8 pages.
(Continued)

*Primary Examiner* — Kaity V Chandler
(74) *Attorney, Agent, or Firm* — Oblon, McClelland, Maier & Neustadt, L.L.P.

(57) ABSTRACT

According to one embodiment, a secondary battery is provided. The secondary battery includes a positive electrode, a negative electrode, and an electrolyte solution. The negative electrode includes a negative electrode current collector including elemental zinc, and a negative electrode layer disposed on the negative electrode current collector. The negative electrode layer includes a negative electrode active material including at least one compound selected from the group consisting of an oxide of titanium, a lithium-titanium oxide, and a lithium-titanium composite oxide. The electrolyte solution includes an aqueous solvent and an electrolyte.

14 Claims, 8 Drawing Sheets

(51) Int. Cl.
  *B60L 7/16* (2006.01)
  *B60L 11/18* (2006.01)
  *H01M 10/44* (2006.01)
  *H01M 10/42* (2006.01)
  *H01M 10/24* (2006.01)
  *H01M 4/02* (2006.01)
  *H01M 4/36* (2006.01)
  *H01M 4/62* (2006.01)
  *H01M 10/36* (2010.01)
  *H01M 4/48* (2010.01)
  *H01M 10/48* (2006.01)

(52) U.S. Cl.
  CPC ........... *B60L 11/1864* (2013.01); *H01M 4/02* (2013.01); *H01M 4/366* (2013.01); *H01M 4/485* (2013.01); *H01M 4/62* (2013.01); *H01M 4/662* (2013.01); *H01M 4/667* (2013.01); *H01M 10/24* (2013.01); *H01M 10/36* (2013.01); *H01M 10/425* (2013.01); *H01M 10/44* (2013.01); *H01M 4/48* (2013.01); *H01M 10/4207* (2013.01); *H01M 10/486* (2013.01); *H01M 2220/20* (2013.01); *H01M 2300/0002* (2013.01)

(56) References Cited

U.S. PATENT DOCUMENTS

| | | | |
|---|---|---|---|
| 2010/0104942 A1 | 4/2010 | Lange et al. | |
| 2010/0136427 A1 | 6/2010 | Kondo et al. | |
| 2011/0091771 A1* | 4/2011 | Sannan | C09D 5/002 429/217 |
| 2012/0009449 A1 | 1/2012 | Inagaki et al. | |
| 2014/0205909 A1* | 7/2014 | Yonehara | H01M 4/42 429/302 |
| 2014/0211370 A1* | 7/2014 | Seymour | H01G 11/36 361/504 |
| 2015/0188100 A1* | 7/2015 | Isozaki | H01M 2/08 429/181 |
| 2015/0295279 A1* | 10/2015 | Numata | H01M 10/399 429/103 |
| 2015/0318530 A1 | 11/2015 | Yushin et al. | |
| 2016/0036026 A1 | 2/2016 | Kano et al. | |
| 2017/0373351 A1 | 12/2017 | Kawai et al. | |

FOREIGN PATENT DOCUMENTS

| | | |
|---|---|---|
| JP | 2000-77073 | 3/2000 |
| JP | 2003-17057 | 1/2003 |
| JP | 2005-71807 | 3/2005 |
| JP | 2006-127848 | 5/2006 |
| JP | 2009-81140 | 4/2009 |
| JP | 2009-110931 A | 5/2009 |
| JP | 2012-18778 A | 1/2012 |
| JP | 5518696 | 6/2014 |
| KR | 10-2009-0021096 A | 2/2009 |
| WO | WO 95/21470 | 8/1995 |
| WO | WO 2009/008280 A1 | 1/2009 |
| WO | WO 2016/114141 A1 | 7/2016 |

OTHER PUBLICATIONS

Extended European Search Report dated Jul. 25, 2017 in Patent Application No. 17160782.3.

* cited by examiner

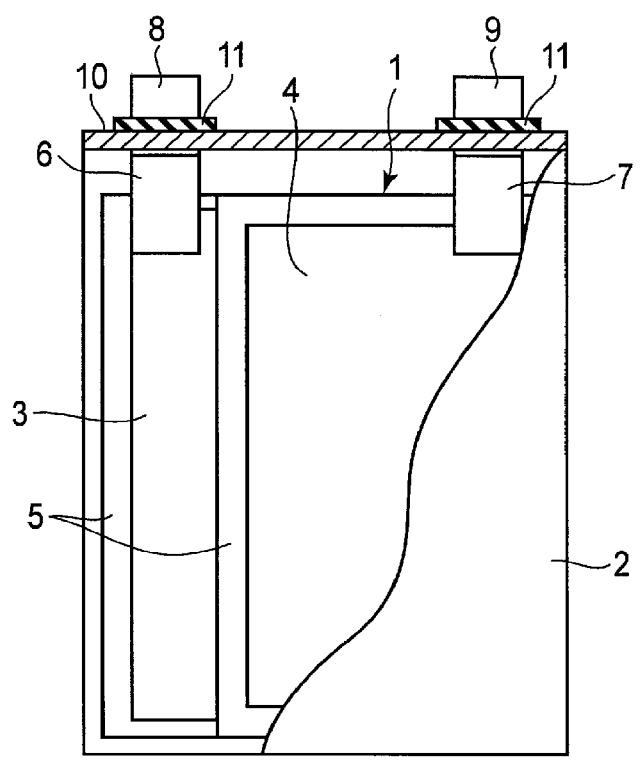
F I G. 1

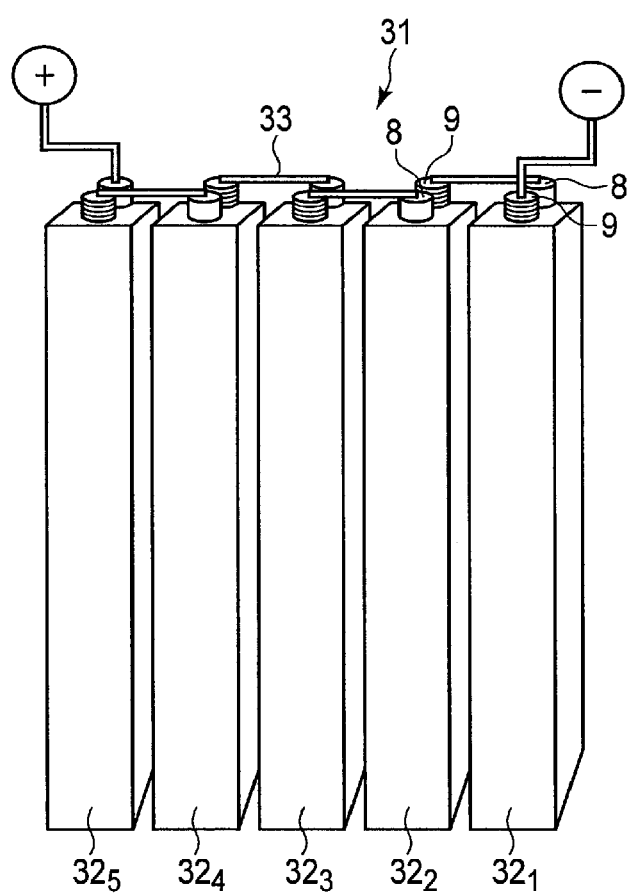
F I G. 5

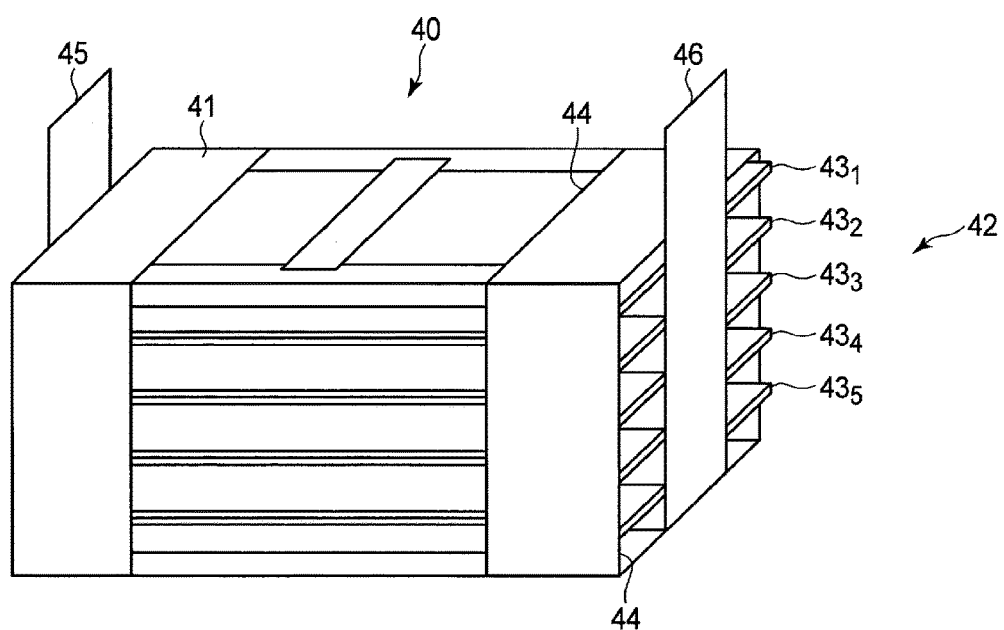
F I G. 6

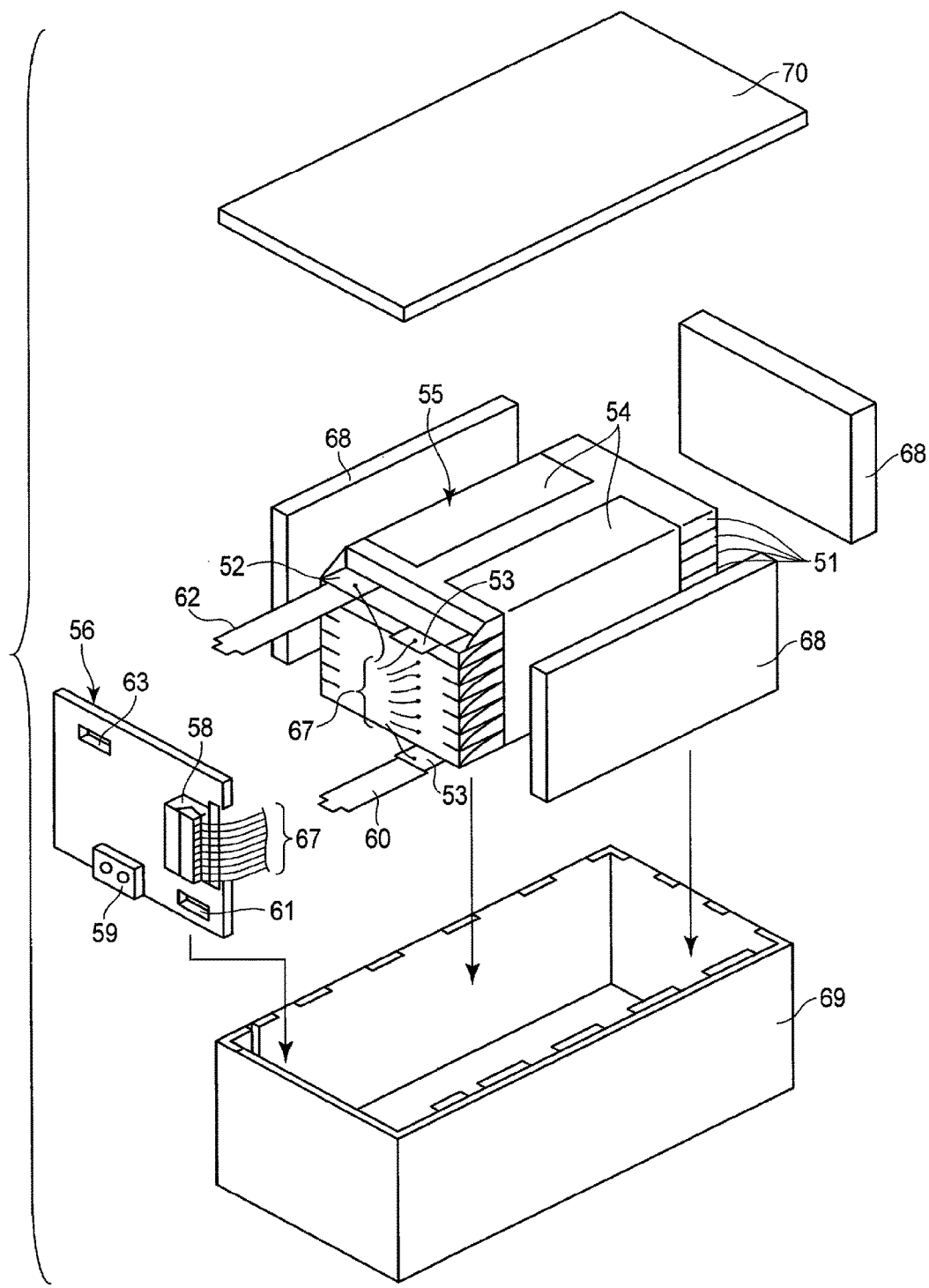
F I G. 7

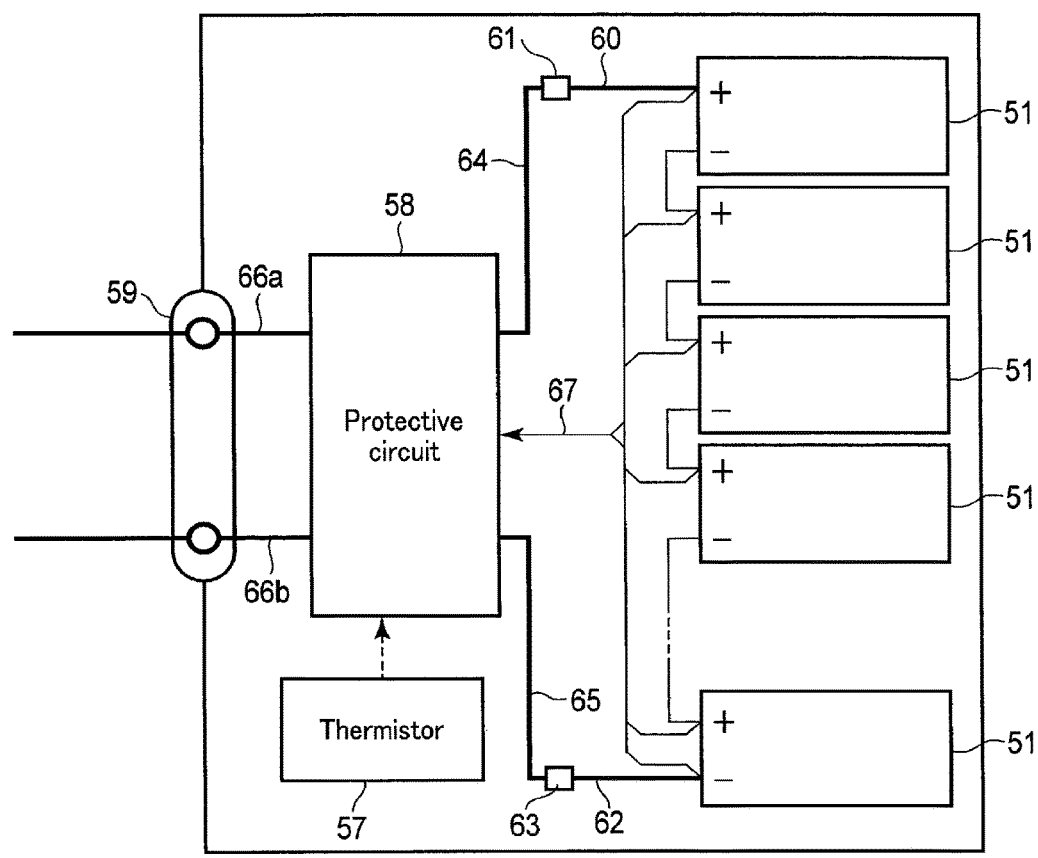
F I G. 8
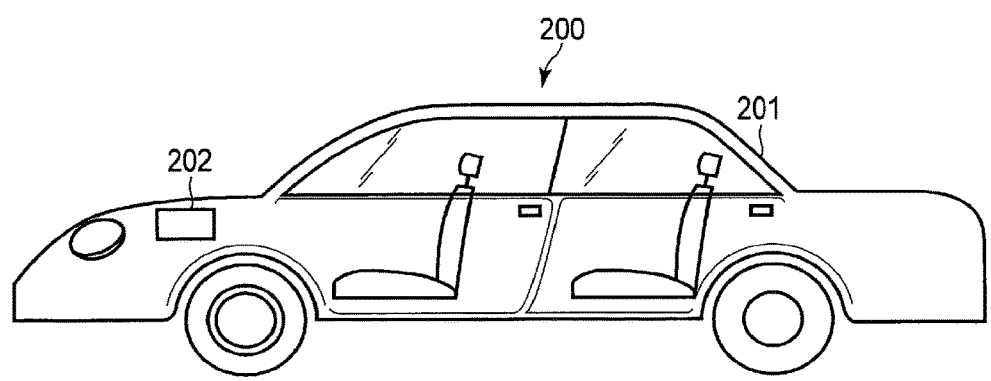
F I G. 9

SECONDARY BATTERY, BATTERY PACK, AND VEHICLE

CROSS-REFERENCE TO RELATED APPLICATION

This application is based upon and claims the benefit of priority from Japanese Patent Application No. 2016-52688, filed Mar. 16, 2016; the entire contents of which is incorporated herein by reference.

FIELD

Embodiments relate to a secondary battery, a battery pack, and a vehicle.

BACKGROUND

Nonaqueous electrolyte batteries, in which a carbon material or a lithium-titanium oxide is used as a negative electrode active material and a layered oxide including nickel, cobalt, manganese, and the like is used as a positive electrode active material, lithium secondary batteries, in particular, have already been put to practical use as a power source in a wide range of fields. Modes of such nonaqueous electrolyte batteries range from small-sized batteries for various electronic devices to large-sized batteries for electric automobiles and the like. In an electrolyte solution for such lithium secondary batteries, unlike a nickel-hydrogen battery or a lead storage battery, used is a nonaqueous organic solvent, in which ethylene carbonate, methyl ethyl carbonate, and the like are mixed. The electrolyte solution using such a solvent has oxidation resistance and reduction resistance that is higher than those of an aqueous electrolyte solution, and thus the electrolysis of the solvent hardly occurs. For that reason, the nonaqueous lithium secondary battery can realize a high electromotive force of 2 V to 4.5 V.

On the other hand, many of the organic solvents are flammable materials, and thus the safety of the nonaqueous lithium secondary battery is apt to be inferior to the secondary battery using an aqueous solution, in principle. Although there are various measures being taken to improve the safety of the lithium secondary battery using the electrolyte solution of the organic solvent, such measures are not necessarily sufficient. Furthermore, for the nonaqueous lithium secondary battery, a dry environment is necessary in the production process, and thus the production cost is consequently increased. In addition, the electrolyte solution of the organic solvent has inferior conductivity, and thus the internal resistance of the nonaqueous lithium secondary battery is apt to increase. These issues have become big defects in applications for electric automobiles and hybrid electric automobiles, in which the battery safety and the battery cost are emphasized, and in an application for a large-sized storage battery for electricity storage.

In order to solve these issues, conversion of the electrolyte solution to an aqueous solution is being put into consideration. In an aqueous electrolyte solution, it is necessary to limit a potential range within which charging and discharging of the battery is performed to be within a potential range where an electrolysis reaction of water, included as a solvent, does not occur. For example, when a lithium-manganese oxide is used as a positive electrode active material and a lithium-vanadium oxide is used as a negative electrode active material, the electrolysis of the aqueous solvent can be avoided. According to this combination, however, though an electromotive force of about 1 V to 1.5 V can be obtained, it is difficult to obtain an energy density sufficient for a battery.

When a lithium-manganese oxide is used as the positive electrode active material and a lithium-titanium oxide such as $LiTi_2O_4$ or $Li_4Ti_5O_{12}$ is used as the negative electrode active material, an electromotive force of about 2.6 V to 2.7 V can be theoretically obtained, and thus the battery can be expected to be attractive in terms of the energy density. In a nonaqueous lithium ion battery employing such a combination of the positive and negative electrode materials, excellent life performance can be obtained, and such a battery described has already been put into practical use. In an aqueous electrolyte solution, however, since a potential of lithium insertion and extraction for the lithium-titanium oxide is about 1.5 V (vs. $Li/Li^+$) relative to a lithium reference potential, electrolysis of the aqueous electrolyte solution is apt to occur. In particular, at the negative electrode, hydrogen is vigorously generated by the electrolysis occurring on a surface of a negative electrode current collector or a metal outer can electrically connected to the negative electrode, and thus the active material may become easily flaked off from the current collector due to the influence of the hydrogen generation. As a result, such a battery does not function stably and sufficient charge and discharge cannot be performed.

BRIEF DESCRIPTION OF THE DRAWINGS

FIG. 1 is a partially cut-out cross-sectional view showing a secondary battery according to an embodiment;

FIG. 5 is a perspective view showing an example of a battery module according to an embodiment;

FIG. 6 is a perspective view showing an example of a battery pack according to an embodiment;

FIG. 7 is an exploded perspective view showing another example of a battery pack according to an embodiment;

FIG. 8 is a block diagram showing an electric circuit of the battery pack of FIG. 7;

FIG. 9 is a cross-sectional view schematically showing an example of a vehicle according to an embodiment.

DETAILED DESCRIPTION

Figure 2:
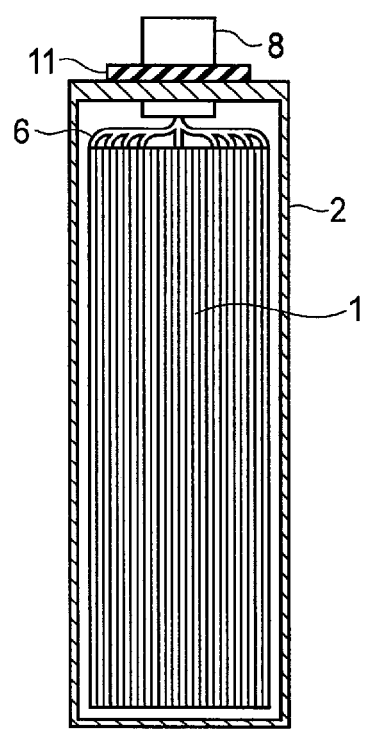
FIG. 2 is a side view showing the battery of FIG. 1.

According to an embodiment, a secondary battery is provided. The secondary battery includes a positive electrode, a negative electrode, and an electrolyte solution. The negative electrode includes a negative electrode current collector including elemental zinc, and a negative electrode layer disposed on the negative electrode current collector. The negative electrode layer includes a negative electrode active material including at least one compound selected from the group consisting of an oxide of titanium, a lithium-titanium oxide, and a lithium-titanium composite oxide. The electrolyte solution includes an aqueous solvent and an electrolyte.

According to another embodiment, a battery pack is provided. The battery pack includes a secondary battery according to the embodiment.

According to yet another embodiment, a vehicle is provided. The vehicle includes a battery pack according to the embodiment.

The embodiments are explained below, with reference to the drawings.

First Embodiment

A lithium secondary battery according to the embodiment includes a positive electrode, a negative electrode, and an electrolyte solution. The negative electrode includes a negative electrode current collector including elemental zinc, and a negative electrode layer disposed on the negative electrode current collector. The negative electrode layer includes a negative electrode active material including at least one compound selected from the group consisting of an oxide of titanium, a lithium-titanium oxide, and a lithium-titanium composite oxide. The electrolyte solution includes an aqueous solvent and an electrolyte.

The lithium secondary battery may further include a separator, and a container member housing the positive electrode, the negative electrode, and the electrolyte solution.

The negative electrode, the positive electrode, the electrolyte solution, the separator, and the container member are explained in detail below.

1) Negative Electrode

The negative electrode includes a negative electrode current collector including elemental zinc, and a negative electrode layer (a negative electrode active material-including layer) disposed on the negative electrode current collector. The negative electrode layer is disposed on at least one surface of the negative electrode current collector. For example, the negative electrode layer may be disposed on one surface of the negative electrode current collector, or negative electrode layers may be disposed on one surface of the negative electrode current collector and on a surface on the reverse side.

The negative electrode layer includes a negative electrode active material including at least one compound selected from the group consisting of an oxide of titanium, a lithium-titanium oxide, and a lithium-titanium composite oxide. The oxides may be used alone or as a mixture of multiple kinds. In the oxides, Li insertion and extraction reaction occurs within a range of 1 V to 2 V (vs. Li/Li$^+$) relative to a lithium reference potential. For that reason, when the oxides described above are used as the negative electrode active material of the lithium secondary battery, the change in volume due to expansion and contraction, which accompany charge and discharge, is small, and thus long operation life can be realized.

On the other hand, hydrogen generation due to the electrolysis of the aqueous solvent readily occurs at around a potential at which the charge and discharge reaction can take place for the oxide of titanium, the lithium-titanium oxide, and the lithium-titanium composite oxide. For that reason, if such an oxide is used as the negative electrode active material together with the electrolyte solution including an aqueous solvent without taking any measure, then the hydrogen generation during the charge and discharge becomes a problem. In particular, the electrolysis more readily occurs on a current collector having a high conductivity, and the active material is easily flaked off from the current collector by the generated hydrogen bubbles. As a result, continuous charge and discharge reaction of the active material can hardly be established, and thus operation of the negative electrode does not stabilize.

The negative electrode of the embodiment includes a negative electrode current collector including the element zinc. Here, the form of the zinc element included in the negative electrode current collector may include zinc (zinc metal), a compound including zinc, and a zinc alloy. In the lithium secondary battery including such a negative electrode, even in the case of combining the negative electrode active material and the electrolyte solution described above, the hydrogen generation is suppressed, and the battery can function stably.

Zinc has a small exchange current density, and thus has a high overvoltage for hydrogen generation. For that reason, hydrogen generation hardly occurs at a negative electrode current collector including zinc. From the above, when the negative electrode including such a negative electrode current collector is used in a lithium secondary battery including an aqueous electrolyte solution, the peeling off of the active material from the current collector can be suppressed. As a result, even at a potential of about 1.5 V (vs. Li/Li$^+$) relative to a lithium reference potential, the charge and discharge can be performed in an aqueous solvent for the oxide of titanium, the lithium-titanium oxide, and the lithium-titanium composite oxide. In addition, zinc is also preferable for being an inexpensive metal.

It is preferable that, in at least a part of a surface region of the negative electrode current collector, the elemental zinc is included at a proportion of 30 atom % or more in a depth region of up to 0.1 μm or more in the depth direction from the surface of the negative electrode current collector. Here, the surface region of the negative electrode current collector refers to, for example, a surface of the negative electrode current collector facing toward the negative electrode layer. Alternatively, the surface region of the negative electrode current collector refers to, for example, a portion at which the negative electrode current collector is in contact with the electrolyte solution. The depth region from the surface of the negative electrode current collector in the depth direction refers to, for example, a portion including a surface layer of the negative electrode current collector. Specifically, the depth region of up to 0.1 μm refers to, for example, a portion at the surface of the current collector having a layer thickness of 0.1 μm.

In order to stably operate the oxide of titanium, the lithium-titanium oxide, and the lithium-titanium composite oxide as the negative electrode active material in an aqueous solvent, it is preferable that, in the surface region of the negative electrode current collector which is in contact with the electrolyte solution, the elemental zinc is included at a proportion of 30 atom % or more in the depth region of up to 0.1 μm or more in the depth direction from the surface. There may be a case in which an electrode group including the negative electrode is impregnated with the electrolyte solution in the lithium secondary battery. In such a case, the whole surface of the negative electrode current collector may get into contact with the electrolyte solution. For that reason, it is preferable that, for example, elemental zinc is included at a proportion of 30 atom % or more in the depth region up to 0.1 μm or more in the depth direction from the surface of the negative electrode current collector over the whole of the surface region of the negative electrode current collector. In the negative electrode having such a structure, the flaking off of the negative electrode active material from the negative electrode current collector is suppressed.

It is more preferable that elemental zinc is included at a proportion of 30 atom % or more over the whole volume of the negative electrode current collector. Such a current collector may include, for example, a foil including elemental zinc at a proportion of 30 atom % or more.

The above described foil including elemental zinc includes, for example, a zinc metal foil and a zinc alloy foil. Such a foil may include one kind of the later described element A or two or more kinds of the element A, in addition to zinc.

With respect to the portions of the negative electrode current collector in surface regions where elemental zinc is included at a proportion of 30 atom % or more, when a range from the surface in the depth direction, i.e., the thickness of the surface layer portion including the zinc element in the proportion described above is less than 0.1 μm, the effect of suppressing the hydrogen generation may not be obtained sufficiently. On the other hand, also in the case where the proportion of zinc element included in the surface layer portion of the current collector is less than 30 atom %, the effect of suppressing the hydrogen generation may not be obtained sufficiently.

The negative electrode current collector may include a substrate including a metal other than zinc. In such a case, by including a first zinc-including coating layer disposed on at least a part of the surface of the substrate, the hydrogen generation can be suppressed. It is desirable that the first zinc-including coating layer is disposed such that the coating layer is in contact with the negative electrode layer. For example, the substrate may be subjected to zinc plating to dispose the first zinc-including coating layer onto the surface of the substrate. Alternatively, the surface of the substrate may be subjected to plating using an alloy including zinc. The first zinc-including coating layer may be a surface layer portion in the negative electrode current collector where the zinc element is included at a proportion of 30 atom % or more.

The substrate preferably includes at least one metal selected from the group consisting of Al, Fe, Cu, Ni, and Ti. The metals may be included in the state of an alloy. The substrate may include the metal or metal alloy alone or as a mixture of two or more kinds. The substrate preferably includes Al, Ti, or an alloy thereof, from the perspective of weight reduction.

The first zinc-including coating layer preferably includes elemental zinc at a proportion of 30 atom % or more. When the proportion of the included zinc element is less than 30 atom %, the effect of suppressing the hydrogen generation may not be obtained sufficiently.

The first zinc-including coating layer preferably has a thickness of 0.1 μm to 10 μm. When the thickness is less than 0.1 μm, the effect of suppressing hydrogen generation may not be sufficiently obtained. When the thickness is more than 10 μm, the adhesion between the first zinc-including coating layer and the substrate may consequently be reduced. The thickness of the first zinc-including coating layer is more preferably from 0.2 μm to 5 μm. It is preferable that the whole surface of the substrate is covered with the first zinc-including coating layer.

The current collector may include an element A other than zinc. It is preferable that at least one element A selected from the group consisting of Ga, In, Bi, Tl, Sn, Pb, Ti and Al, is included in the current collector as a dopant. The element A may be used alone or as a mixture of multiple kinds of elements, and may be included in the state of a metal or metal alloy. The metal and metal alloy may be included alone or as a mixture of two or more kinds. When the element A is included in the current collector, the mechanical strength of the current collector is increased and thus the processing thereof is improved. Further, the effect of suppressing the electrolysis of the aqueous solvent to thereby suppress the hydrogen generation is increased. Of the elements described above, Pb, Ti and Al are more preferable.

The amount of the element A included in the current collector is preferably 70 atom % or less. When the included amount is more than 70 atom %, the weight of the current collector is increased, and the energy density may be reduced. Furthermore, the effect of suppressing hydrogen generation may not be exhibited. The included amount is more preferably 40 atom % or less.

When the current collector includes the first zinc-including coating layer, it is desirable that the above-described element (element A) is included in the first zinc-including coating layer. In such a case, it is preferable that the first zinc-including coating layer includes the element A in an amount of 70 atom % or less, because there is concern that the energy density may be reduced. The included amount is more preferably 40 atom % or less.

The current collector may include at least one compound selected from the group consisting of an oxide of zinc, a hydroxide of zinc, and a basic zinc carbonate compound. The oxide of zinc and/or the hydroxide of zinc and/or the basic zinc carbonate compound are preferably included in the current collector within a depth region of from 5 nm to 1 μm in the depth direction from the surface, in at least a part of the surface region of the current collector. An example of the oxide of zinc includes ZnO, an example of the hydroxide of zinc includes $Zn(OH)_2$, and an example of the basic zinc carbonate compound includes $2ZnCO_3 \cdot 3Zn(OH)_2$, and the like.

As described above, when at least one of the oxide of zinc, the hydroxide of zinc, and the basic zinc carbonate compound exists in the surface layer portion of the current collector, the effect of suppressing the hydrogen generation is increased. When the compounds exist on the surface layer portion of the current collector, the adhesion between the current collector and the active material is improved.

When the range in the depth direction of the region in which the above compounds are included is less than 5 nm from the surface of the current collector, the effect described above may not be sufficiently obtained. When the range in the depth direction is more than 1 μm, the contact resistance between the current collector and the active material is increased, and thus the internal resistance of the battery may consequently be increased. It is more preferable that the range in the depth direction of the area where the oxide of zinc and/or the hydroxide of zinc and/or the basic zinc carbonate compound are included is a range of up to 10 nm to 50 nm from the surface of the current collector. Here, when the above described compounds can be detected according to, for example, a method described later, it can be determined that the compounds are present within the measured region (the surface region and the depth region).

The zinc atom in the oxide of zinc, the hydroxide of zinc, and the basic zinc carbonate compound is in an oxidized state. For that reason, the surface layer portion of the current collector in which the oxide of zinc and/or the hydroxide of zinc and/or the basic zinc carbonate compound are included is referred to as an "oxidized zinc-including region" for convenience, herein. In other words, the current collector may include an oxidized zinc-including region, which includes at least one compound selected from the group consisting of the oxide of zinc, the hydroxide of zinc, and the basic zinc carbonate compound. When the oxidized zinc-including region is included in at least a part of the surface of the current collector, the effect of suppressing the hydrogen generation is increased, and the adhesion between the current collector and the active material is improved.

When the range of the oxidized zinc-including region in the depth direction from the surface of the current collector is defined as a thickness of the oxidized zinc-including region, it is preferable that the thickness is from 5 nm to 1 µm. When the thickness is less than 5 nm, the effect described above may not be sufficiently obtained. When the thickness is more than 1 µm, the contact resistance between the current collector and the active material is increased, and thus the internal resistance of the battery may consequently be increased. The thickness of the oxidized zinc-including region is more preferably from 10 nm to 50 nm. Here, for example, when at least one compound selected from the group consisting of the oxide of zinc, the hydroxide of zinc, and the basic zinc carbonate compound can be detected in the depth region of up to 5 nm to 1 µm from the surface of the current collector by a detection method described later, it can be determined that the oxidized zinc-including region having a thickness of from 5 nm to 1 µm is present in that surface area.

The oxidized zinc-including region can be formed, for example, by depositing elemental zinc on the current collector and oxidizing the zinc in air. Alternatively, the oxidized zinc-including region can be formed by charging a battery including a current collector to thereby precipitate a zinc-including compound, which has been eluted in an electrolyte solution, onto the surface of the current collector. When the oxidized zinc-including region is formed by charging the battery, the thickness and the range of coverage thereof can be adjusted by changing the composition of the current collector or the conditions for producing the lithium secondary battery. Here, the conditions for production, which can be adjusted, include, for example, a waiting time and a waiting temperature from the insertion of the electrolyte solution into the battery until initial charging, a charging current value when the battery is charged, and the like. These conditions are described in detail later.

The negative electrode may further include a second zinc-including coating layer including at least one metal, alloy, or compound selected from the group consisting of elemental zinc, an oxide of zinc, a hydroxide of zinc, and a basic zinc carbonate compound. The second zinc-including coating layer may be disposed on at least a part of the surface of the negative electrode layer, for example on an outermost layer of the negative electrode. Alternatively, when the active material included in the negative electrode layer is in a particulate state, the second zinc-including coating layer may be disposed, for example, on at least a part of the surface of the active material particles.

The second zinc-including coating layer may include the zinc element, the oxide of zinc, the hydroxide of zinc, or the basic zinc carbonate compound alone. Alternatively, the second zinc-including coating layer may include two or more kinds of the elemental zinc, the oxide of zinc, the hydroxide of zinc, and the basic zinc carbonate compound.

It is preferable that the second zinc-including coating layer is included in the negative electrode layer, because the ion conductivity in the negative electrode is improved, and the effect of suppressing the hydrogen generation is remarkably increased. Furthermore, when the second zinc-including coating layer is included, the insertion and extraction of Li ions in the negative electrode can proceed smoothly, thus resulting in improved life performance.

The second zinc-including coating layer preferably has a thickness of 0.01 µm to 0.5 µm. When the thickness is less than 0.01 µm, the effect of increasing the suppression of hydrogen generation may not be obtained. In addition, the life performance may not be improved. On the other hand, when the thickness is more than 0.5 µm, the contact resistance between the negative electrode layer and the current collector is increased, and thus the battery internal resistance may consequently be increased.

The method for forming the second zinc-including coating layer include, for example, the following methods. When the second zinc-including coating layer that includes metal zinc as a main component is formed, for example, the active material particles or the electrode layer disposed on the current collector may be subjected to plating using zinc, or zinc may be deposited onto the active material particles or electrode layer. Alternatively, a battery including the electrode may be charged whereby zinc element, which has been eluted into the electrolyte solution, can be precipitated onto the active material particles and/or the electrode layer. Similarly, in the formation of the second zinc-including coating layer that includes the oxide of zinc and/or the hydroxide of zinc and/or the basic zinc carbonate compound, it is possible to use a method of depositing and then oxidizing zinc, and a method of precipitating zinc from the electrolyte solution. The method can also be applied to the formation of the oxidized zinc-including region described above.

In particular, when the oxidized zinc-including region and/or second zinc-including coating layer is formed by precipitating a zinc-including component from the electrolyte solution during charging, the precipitation can be controlled as follows. For example, the electrode group including the negative electrode and the positive electrode, which has not been charged, may be impregnated with the electrolyte solution, whereby zinc can be eluted out from the current collector. An amount of zinc eluted into the electrolyte solution can be controlled by adjusting the time of waiting from the contact between the electrode group and the electrolyte solution until the initial charging of the battery, and the temperature during the waiting.

Alternatively, a zinc-including compound such as $ZnSO_4$ may be added to the electrolyte solution, to intentionally obtain dissolved zinc. In this case, a concentration can be adjusted by an amount of the compound added to the electrolyte solution. It is also possible to shorten the waiting time until the initial charging.

When the battery is charged, the precipitation reaction of elemental zinc is started before Li is inserted into the negative electrode active material. This is considered to be because, upon charging of the electrode group from an uncharged state to a state where Li is inserted into the negative electrode active material, a potential of the negative electrode reaches a potential at which Li is inserted and extracted in the negative electrode active material after passing through an ionization potential of zinc. At this time, the charging speed (the charging rate) and the temperature can be adjusted, to thereby control an amount of the zinc-including compound precipitated onto the surface of the active material particle and/or the negative electrode layer, and a state of the coating layer including the zinc-including compound. For example, when the waiting time is prolonged and/or waiting temperature is elevated, there is a tendency for the amount of zinc eluting into the electrolyte solution to increase, whereby the surface of the current collector becomes easily oxidized. When the charging current value is increased, there is a tendency for the amount of the zinc compound precipitated to decrease.

Next, a method for examining the first zinc-including coating layer, the second zinc-including coating layer, and the oxidized zinc-including region in the negative electrode is explained.

The second zinc-including coating layer can be examined by an observation with a scanning electron microscope (SEM) or a transmission electron microscope (TEM), an elemental analysis using an energy-dispersive X-ray spectroscopy (EDX), and detection using an X-ray photoelectron spectroscopic measurement (XPS). For example, first, after a lithium secondary battery, which has been already subjected to initial charging, is discharged, the battery is disassembled to take out the negative electrode therefrom. The negative electrode, taken out, is washed with pure water for 30 minutes, and then subjected to drying under vacuum at a temperature environment of 80° C. for 24 hours. After the drying, the temperature is returned to 25° C., and the surface of the negative electrode layer and the active material particles included in the negative electrode layer of the taken out negative electrode are observed using SEM or TEM, whereby the presence or absence of the precipitate can be examined. Next, the precipitate is subjected to the elemental analysis using EDX, to examine whether or not elemental zinc is included in the precipitate. The presence of elemental zinc, the oxide of zinc, the hydroxide of zinc, or the basic zinc carbonate compound can be examined from the spectrum obtained from XPS measurement of the precipitate. When a cross-sectional SEM-EDX measurement is performed on the negative electrode, the thickness of the second zinc-including coating layer can be obtained.

The first zinc-including coating layer can be examined by subjecting the negative electrode current collector to the cross-sectional SEM-EDX measurement. For example, first, similarly as above, the negative electrode that has been taken out from the battery is washed with pure water for 30 minutes, and then subjected to drying under vacuum at an environment of 80° C. for 24 hours. The dried negative electrode is cooled to 25° C., and then the negative electrode layer is dislodged from the negative electrode current collector. The negative electrode layer can be dislodged, for example, by scraping using a spatula. The negative electrode current collector, thus obtained by dislodging the negative electrode layer, is subjected to the cross-sectional SEM-EDX measurement, whereby the thickness of the first zinc-including coating layer can be obtained.

The oxidized zinc-including region can be examined by the XPS measurement of the negative electrode current collector. For example, first, the negative electrode layer is dislodged from the negative electrode current collector, similarly to the case of examining the first zinc-including coating layer. Next, the XPS measurement is performed while the surface of the current collector is subjected to etching. By obtaining an XPS spectrum every time etching is performed on the surface of the current collector, the presence of elemental zinc, the oxide of zinc, the hydroxide of zinc, or the basic zinc carbonate compound at each of the respective depths from the surface of the current collector can be confirmed. From the depth of the etching taken until the oxide of zinc and/or the hydroxide of zinc and/or the basic zinc carbonate compound are no longer detected, the thickness of the oxidized zinc-including region can be obtained.

The negative electrode active material includes one compound, or two or more compounds selected from the group consisting of an oxide of titanium, lithium-titanium oxide, and lithium-titanium composite oxide. Examples of the lithium-titanium composite oxide include a niobium-titanium oxide and a sodium-niobium-titanium oxide. The compounds desirably have a Li insertion potential in a range of 1 V (vs. Li/Li$^+$) to 3 V (vs. Li/Li$^+$).

Examples of the oxide of titanium include an oxide of titanium having a monoclinic structure, an oxide of titanium having a rutile structure, and an oxide of titanium having an anatase structure. For the oxide of titanium having each crystal structure, the composition before charging can be represented by TiO$_2$, and the composition after charging can be represented by Li$_x$TiO$_2$, wherein x is 0≤x. The structure before charging for the oxide of titanium having the monoclinic structure can be represented by TiO$_2$(B).

Examples of the lithium-titanium oxide include a lithium-titanium oxide having a spinel structure (for example, the general formula: Li$_{4+x}$Ti$_5$O$_{12}$ wherein x is −1≤x≤3), a lithium-titanium oxide having a ramsdellite structure (for example, Li$_{2+x}$Ti$_3$O$_7$ wherein −1≤x≤3), Li$_{1+x}$Ti$_2$O$_4$ wherein 0≤x≤1, Li$_{1.1+x}$Ti$_{1.8}$O$_4$ wherein 0≤x≤1, Li$_{1.07+x}$Ti$_{1.86}$O$_4$ wherein 0≤x≤1, and Li$_x$TiO$_2$ wherein 0<x≤1), and the like. The lithium-titanium oxide includes, for example, a lithium-titanium composite oxide in which a dopant is introduced into the above lithium-titanium oxide having the spinel structure or the ramsdellite structure.

Examples of the niobium-titanium oxide include oxides represented by Li$_a$TiM$_b$Nb$_{2\pm\beta}$O$_{7\pm\sigma}$ wherein 0≤a≤5, 0≤b≤0.3, 0≤β≤0.3, 0≤σ≤0.3, and M is at least one element selected from the group consisting of Fe, V, Mo, and Ta.

Examples of the sodium-niobium-titanium oxide include an orthorhombic Na-including niobium-titanium-composite oxide represented by the general formula Li$_{2+v}$Na$_{2-w}$M1$_x$Ti$_{6-y-z}$Nb$_y$M2$_z$O$_{14+\delta}$ wherein 0≤v≤4, 0<w<2, 0≤x<2, 0<y<6, 0≤z<3, y+z<6, −0.5≤δ≤0.5, M1 includes at least one element selected from the group consisting of Cs, K, Sr, Ba, and Ca, and M2 includes at least one element selected from the group consisting of Zr, Sn, V, Ta, Mo, W, Fe, Co, Mn, and Al.

Preferable compounds for the negative electrode active material may include the oxide of titanium having an anatase structure, the oxide of titanium having a monoclinic structure, and the lithium-titanium oxide having the spinel structure. Each compound has a Li insertion potential of 1.4 V (vs. Li/Li$^+$) to 2 V (vs. Li/Li$^+$), and thus, when combined with the lithium-manganese oxide as the positive electrode active material, for example, a high electromotive force can be obtained. Especially, the lithium-titanium oxide having the spinel structure is more preferable because the change in volume due to the charge and discharge reaction is very small.

The negative electrode active material may be included in the negative electrode layer in the form of particles. The negative electrode active material particle may be singular primary particles, secondary particles in which each of the secondary particles include aggregated primary particles, or a mixture of singular primary particles and secondary particles. The shape of the particles is not particularly limited and, for example, may be a spherical shape, an elliptic shape, a flat shape, a fiber shape, or the like.

It is preferable that an average particle size (a diameter) of the secondary particles of the negative electrode active material is 3 μm or more, more preferably from 5 μm to 20 μm. When the size is within this range, the surface area of the active material is small, and thus the effect of suppressing the hydrogen generation can be increased.

The negative electrode active material having the secondary particles whose average particle size is 3 μm or more can be obtained, for example, by the following method. First, an active material precursor having an average particle size of 1 µm or less is produced by synthesis, in which starting materials for the active material reacted. After that, the active material precursor is subjected to a calcining treatment, followed by a pulverization treatment using a pulverizer such as a ball mill or a jet mill. Next, by a calcining treatment, the active material precursors are aggregated and grown into secondary particles having a large particle size.

The primary particles in the negative electrode active material desirably have an average particle size of 1 µm or less. By this procedure, a diffusion length of Li ions in the inside of the active material is shortened, and a specific surface area becomes larger. Therefore, high input performance (rapid charging performance) can be obtained. On the other hand, when the average particle size is small, the particles become easily aggregated, and the distribution of the electrolyte solution is inclined toward the negative electrode, and the electrolyte may consequently be exhausted at the positive electrode. For that reason, the lower limit of the average primary particle size is desirably 0.001 µm. The average particle size is more preferably from 0.1 µm to 0.8 µm.

The negative electrode active material particles desirably have a specific surface area of 3 $m^2/g$ to 200 $m^2/g$, as determined by a BET method employing $N_2$ adsorption. By having such a specific surface area, the affinity between the negative electrode and the electrolyte solution can be further enhanced.

The negative electrode layer (excluding the current collector) desirably has a specific surface area of 3 $m^2/g$ to 50 $m^2/g$. The specific surface area is more preferably from 5 $m^2/g$ to 50 $m^2/g$. The negative electrode layer may be a porous layer including the negative electrode active material, the conductive agent, and the binder, which is supported on the current collector.

The porosity of the negative electrode (excluding the current collector) is desirably in a range of 20% to 50%, whereby a negative electrode having excellent affinity between the negative electrode and the electrolyte solution and high density can be obtained. The porosity is more preferably in a range of 25% to 40%.

The conductive agent may include carbon materials such as acetylene black, carbon black, coke, carbon fiber, and graphite, and powders of a metal such as nickel or zinc. The conductive agent may be used alone or as a mixture of two or more kinds. It is desirable to use the metal powder as the conductive agent, because hydrogen is generated from the carbon material itself.

The binder may include, for example, polytetrafluoroethylene (PTFE), polyvinylidene fluoride (PVdF), fluororubber, ethylene-butadiene rubber, polypropylene (PP), polyethylene (PE), carboxymethyl cellulose (CMC), polyimide (PI), polyacrylimide (PAI), and the like. The binder may be used alone or as a mixture of two or more kinds.

With respect to the mixing ratio of the negative electrode active material, the conductive agent, and the binder in the negative electrode layer, it is preferable that the negative electrode active material is included in a range of 70% by weight to 95% by weight, the conductive agent is included in a range of 3% by weight to 20% by weight, and the binder is included in a range of 2% by weight to 10% by weight. When the mixing ratio of the conductive agent is 3% by weight or more, the conductivity of the negative electrode can be made good, and when the mixing ratio is 20% by weight or less, the decomposition of the electrolyte on the surface of the conductive agent can be reduced. When the mixing ratio of the binder is 2% by weight or more, sufficient electrode strength can be obtained, and when the mixing ratio is 10% by weight or less, the insulating portions within the electrode can be reduced.

The negative electrode can be produced, for example, by the following method. First, the negative electrode active material, the conductive agent, and the binder are dispersed in an appropriate solvent to prepare a slurry. The resulting slurry is coated onto the current collector, and the coat of applied slurry is dried to form the negative electrode layer on the current collector. Here, for example, the slurry may be coated on one side of the current collector, or may be coated on one surface of the current collector and a surface on the reverse side. Then, the current collector and the negative electrode layer are subjected to pressing, for example, heat pressing, whereby the negative electrode can be produced.

2) Positive Electrode

The positive electrode may include a positive electrode current collector, and a positive electrode layer (a positive electrode active material-including layer), which is supported on one surface or both of reverse surfaces of the positive electrode current collector and includes an active material, a conductive agent, and a binder.

It is preferable to use a foil, porous structure, or mesh made of a metal such as stainless steel, Al, or Ti as the positive electrode current collector. In order to prevent corrosion of the current collector, caused by the reaction of the current collector with the electrolyte solution, the surface of the current collector may be covered with another element.

A material capable of having lithium inserted and extracted may be used for the positive electrode active material. The positive electrode may include one kind of positive electrode active material, or include two or more kinds of positive electrode active materials. Examples of the positive electrode active material include a lithium-manganese composite oxide, a lithium-nickel composite oxide, a lithium-cobalt-aluminum composite oxide, a lithium-nickel-cobalt-manganese composite oxide, a spinel-type lithium-manganese-nickel composite oxide, a lithium-manganese-cobalt composite oxide, a lithium-iron oxide, a lithium fluorinated iron sulfate, a phosphate compound having an olivine crystal structure (for example, $Li_xFePO_4$ wherein $0 \leq x \leq 1$, and $Li_xMnPO_4$ wherein $0 \leq x \leq 1$), and the like. The phosphate compound having an olivine crystal structure has excellent thermal stability.

Examples of the positive electrode active material with which a high positive electrode potential can be obtained are described below. Examples include lithium-manganese composite oxides such as $Li_xMn_2O_4$ having a spinel structure wherein $0 < x \leq 1$, or $Li_xMnO_2$ wherein $0 < x \leq 1$; a lithium-nickel-aluminum composite oxide such as $Li_xNi_{1-y}Al_yO_2$ wherein $0 < x \leq 1$ and $0 < y \leq 1$; lithium-cobalt-composite oxides such as $Li_xCoO_2$ wherein $0 < x \leq 1$; lithium-nickel-cobalt composite oxides such as $Li_xNi_{1-y-z}Co_yMn_zO_2$ wherein $0 < x \leq 1$, $0 < y \leq 1$, and $0 \leq z \leq 1$; lithium-manganese-cobalt composite oxides such as $Li_xMn_yCo_{1-y}O_2$ wherein $0 < x \leq 1$ and $0 < y \leq 1$; spinel-type lithium-manganese-nickel composite oxides such as $Li_xMn_{2-y}Ni_yO_4$ wherein $0 < x \leq 1$ and $0 < y < 2$; lithium-phosphorus oxides having an olivine structure such as $Li_xFePO_4$ wherein $0 < x \leq 1$, $Li_xFe_{1-y}Mn_yPO_4$ wherein $0 < x \leq 1$ and $0 \leq y \leq 1$, or $Li_xCoPO_4$ wherein $0 < x \leq 1$; fluorinated iron sulfates such as $Li_xFeSO_4F$ wherein $0 < x \leq 1$, and the like.

The particle of the positive electrode active material may be singular primary particles, secondary particles in which each of the secondary particles include aggregated particles, and a mixture of both the singular primary particles and the secondary particles. The primary particles of the positive electrode active material preferably have an average particle size (a diameter) of 10 µm or less, more preferably from 0.1 µm to 5 µm. The secondary particles of the positive electrode active material preferably have an average particle size (a diameter) of 100 µm or less, more preferably from 10 µm to 50 µm.

It is preferable that at least a part of the particle surface of the positive electrode active material is covered with a carbon material. The carbon material may be in the form of a layered structure, a particulate structure, or a form of aggregated particles.

As the conductive agent for increasing the electron conductivity of the positive electrode layer and suppressing the contact resistance between the positive electrode layer and the current collector, examples include acetylene black, carbon black, graphite, carbon fiber having an average fiber diameter of 1 µm or less, and the like. The conductive agent may be used alone or as a mixture of two or more kinds.

The binder for binding the active material to the conductive agent include, for example, polytetrafluoroethylene (PTFE), polyvinylidene fluoride (PVdF), fluororubber, ethylene-butadiene rubber, styrene-butadiene rubber (SBR), polypropylene (PP), polyethylene (PE), carboxymethyl cellulose (CMC), polyimide (PI), and polyacrylimide (PAI). The binder may be used alone or as a mixture of two or more kinds.

With respect to the mixing ratio of the positive electrode active material, the conductive agent, and the binder in the positive electrode layer, it is preferable that the positive electrode active material is included in a range of 70% by weight to 95% by weight, the conductive agent is included in a range of 3% by weight to 20% by weight, and the binder is included in a range of 2% by weight to 10% by weight. When the mixing ratio of the conductive agent is 3% by weight or more, the conductivity of the positive electrode can be made good, and when the mixing ratio is 20% by weight or less, the decomposition of the electrolyte on the surface of the conductive agent can be reduced. When the mixing ratio of the binder is 2% by weight or more, sufficient electrode strength can be obtained, and when the mixing ratio is 10% by weight or less, the insulating portions within the electrode can be reduced.

The positive electrode can be produced, for example, by the following method. First, the positive electrode active material, the conductive agent, and the binder are dispersed in an appropriate solvent to prepare a slurry. The resulting slurry is coated onto the current collector, and the coat of applied slurry is dried to form the positive electrode layer on the current collector. Here, for example, the slurry may be coated on one side of the current collector, or may be coated on one surface of the current collector and a surface on the reverse side. Then, the current collector and the positive electrode layer are subjected to pressing, for example, heat pressing, whereby the positive electrode can be produced.

3) Electrolyte Solution

The electrolyte solution includes an aqueous solvent and an electrolyte.

The electrolyte solution includes, for example, an aqueous solution prepared by dissolving a lithium salt in an aqueous solution, and a gel electrolyte in which a composite between a polymer material and the aqueous solution is obtained. The polymer material includes, for example, polyvinylidene fluoride (PVdF), polyacrylonitrile (PAN), polyethylene oxide (PEO), and the like.

The aqueous solution described above preferably includes a water solvent in an amount of 1 mol or more, based on 1 mol of a salt as solute. The amount of water solvent is more preferably 3.5 mol or more, based on 1 mol of the salt as solute.

The aqueous solution may be prepared, for example, by dissolving, as the electrolyte, a lithium salt in a concentration of 1 to 12 mol/L, more preferably 1 to 10 mol/L in an aqueous solvent. In order to suppress the electrolysis of the electrolyte solution, pH can be adjusted by addition of LiOH or $Li_2SO_4$. The pH value range is preferably from 3 to 13, more preferably from 4 to 12.

As the aqueous solvent, a solution including water may be used. Here, the solution including water may be pure water, or a mixed solution or a mixed solvent of water and a substance other than water.

The lithium salt which may be used as the electrolyte include, for example, LiCl, LiBr, LiOH, $Li_2SO_4$, $LiNO_3$, LiTFSA (lithium trifluoromethanesulfonyl amide; $LiN(SO_2CF_3)_2$), LiBETA (lithium bispentafluoroethanesulfonyl amide; $LiN(SO_2C_2F_5)_2$), LiFSA (lithium bisfluorosulfonyl amide; $LiN(SO_2F)_2$), $LiB[(OCO)_2]_2$, and the like. The lithium salt may be used alone or as a mixture of two or more kind.

Of the lithium salts, it is preferable to include LiCl. By doing so, the concentration of lithium ions can be increased to 6 M/L or more. When the concentration of Li ions in the electrolyte solution is adjusted to 6 M/L or more, the electrolysis reaction of the aqueous solvent on the negative electrode can be suppressed, and thus the hydrogen generation on the negative electrode can be reduced. The concentration is more preferably from 6 M/L to 10 M/L.

On the other hand, even if the concentration (M/L) is the same, a molar ratio of the aqueous solvent (e.g., water) to the solute varies because a specific gravity varies depending on the electrolyte support salt used. In particular, a molar ratio of the aqueous solvent (e.g., water) to the solute tends to decrease in an amide support salt. When the molar ratio of the aqueous solvent (e.g., water) decreases as above, it tends to be difficult to form the second zinc-including coating layer.

A zinc-including compound such as $ZnSO_4$ may be added to the electrolyte solution in addition to the lithium salt. When such a compound is added to the electrolyte solution, a zinc-including coating layer and/or an oxidized zinc-including region may be formed on the electrode, as described above.

It is preferable that as an anion species in the electrolyte solution, in which the lithium salt is dissolved, at least one selected from the group consisting of a chlorine ion ($Cl^-$), a hydroxide ion ($OH^-$), a sulfate ion ($SO_4^{2-}$), and a nitrate ion ($NO_3^-$) is present.

The electrolyte solution may include both lithium ions and sodium ions.

Whether or not water is included in the electrolyte solution can be examined by GC-MS (a gas chromatography-mass spectrometry) measurement. A salt concentration and a water content in the electrolyte solution can be calculated, for example, from ICP (inductively coupled plasma) emission spectrometry, or the like. A standard amount of the electrolyte solution is measured out, and a concentration of the salt included in the solution is measured, whereby a molar concentration (mol/L) thereof can be calculated. In addition, the mole numbers of the solute and the solvent can be calculated from the measurement of a specific gravity of the electrolyte solution.

4) Separator

A separator may be disposed between the positive electrode and the negative electrode. When the separator is made from an insulating material, it is possible to prevent electrical contact between the positive electrode and the negative electrode. In addition, it is desirable to use a separator having a shape that allows the electrolyte solution to be capable of migrating between the positive electrode and the negative electrode. Examples of the separator include a non-woven, a film, a paper sheet, and the like. Examples of the material forming the separator may include polyolefin such as polyethylene and polypropylene, and cellulose. Preferable examples of the separator include a non-woven including cellulose fiber and a porous film including a polyolefin fiber. The separator preferably has a porosity of 60% or more. The fiber diameter is preferably 10 μm or less. When the fiber diameter is 10 μm or less, the affinity of the separator with the electrolyte is improved, thus resulting in decreased battery resistance. The more preferable range of the fiber diameter is 3 μm or less. The cellulose-including non-woven having a porosity of 60% or more can be well impregnated with the electrolyte, and can exhibit a high output performance at a low temperature to a high temperature. In addition, even during storage for a long time in a charged state, during float charging, or when exposed to overcharge, the separator does not react with the negative electrode, and short-circuiting between the negative electrode and the positive electrode, caused by precipitation of dendrites of the lithium metal, does not occur. The more preferable range is from 62% to 80%.

A solid electrolyte may also be used as the separator. As the separator, oxides such as LATP ($Li_{1+x}Al_xTi_{2-x}(PO_4)_3$, where $0.1 \leq x \leq 0.4$) having a NASICON type framework, LATP ($Li_{2.9}PO_{3.3}N_{0.46}$) which is amorphous, garnet type LLZ ($Li_7La_3Zr_2O_{12}$) are preferable.

The separator preferably has a thickness of 20 μm to 100 μm, and a density of 0.2 g/cm³ to 0.9 g/cm³. When these parameters are within the ranges described above, the mechanical strength and the reduction of battery resistance can be well-balanced, and a lithium secondary battery having a high output and having suppressed internal short-circuiting can be provided. In addition, there is little thermal contraction of the separator under a high temperature environment, and the capability for the battery to be stored under high temperature becomes good.

5) Container Member

A container made of metal, a container made of laminate film, a container made of resin, such as polyethylene or polypropylene, may be used for a container member in which the positive electrode, the negative electrode, and the electrolyte solution are housed.

As the container made of metal, a metal can made of nickel, iron, stainless steel, or zinc and having an angular or cylindrical shape may be used.

The container made of resin and the container made of metal desirably have a wall thickness within a range of 1 mm or less, and more preferably 0.5 mm or less. An even more preferable range is 0.3 mm or less. The lower limit of the wall thickness is desirably 0.05 mm.

The laminate film includes, for example, a multilayer film in which a metal layer is covered with resin layers, and the like. Examples of the metal layer include a stainless steel foil, an aluminum foil, and an aluminum alloy foil. A polymer such as polypropylene (PP), polyethylene (PE), nylon, and polyethylene terephthalate (PET) may be used for the resin layer. The laminate film preferably has a thickness of 0.5 mm or less, more preferably 0.2 mm or less. The lower limit of the thickness of the laminate film is desirably 0.01 mm.

The lithium secondary battery according to the embodiment can be applied to secondary batteries of various forms such as an angular shaped form, cylindrical shaped form, a flat-type, a thin-type, or a coin-type. The secondary battery preferably has a bipolar structure, whereby there is an advantage in that a cell having plural electrode units connected in series can be produced with a single cell.

One example of a lithium secondary battery according to the embodiment is explained with reference to FIG. 1 to FIG. 4.

One example of a lithium secondary battery using a container made of metal is shown in FIG. 1 and FIG. 2.

The electrode group 1 is housed in a rectangular-tube-shaped metal container 2. The electrode group 1 has a structure in which the positive electrode 3, the negative electrode 4, and the separator 5 disposed therebetween are spirally wound in a manner such that a flat shape is obtained. An electrolyte solution (not shown) is held in the electrode group 13. As shown in FIG. 2, a belt-shaped positive electrode lead 6 is electrically connected to each of plural positions on the edge of the positive electrode 3 located on the end surface of the electrode group 1. A belt-shaped negative electrode lead 7 is electrically connected to each of plural positions on the edge of the negative electrode 4 located on the end surface. The plural positive electrode leads 6 are bundled into one, and electrically connected to a positive electrode conductive tab 8. A positive electrode terminal is composed from the positive electrode leads 6 and the positive electrode conductive tab 8. The negative electrode leads 7 are bundled into one, and connected to a negative electrode conductive tab 9. A negative electrode terminal is composed from the negative electrode leads 7 and the negative electrode conductive tab 9. A metal sealing plate 10 is fixed over an opening of the metal container 2 by welding or the like. The positive electrode conductive tab 8 and the negative electrode conductive tab 9 are respectively drawn out from outlets, which are provided on the sealing plate 10, to the outside. The inner circumferential surface of each outlet of the sealing plate 10 is covered with an insulating member 11, in order to avoid short-circuiting due to contact of the sealing plate 10 with the positive electrode conductive tab 8 and the negative electrode conductive tab 9.

Figure 3:
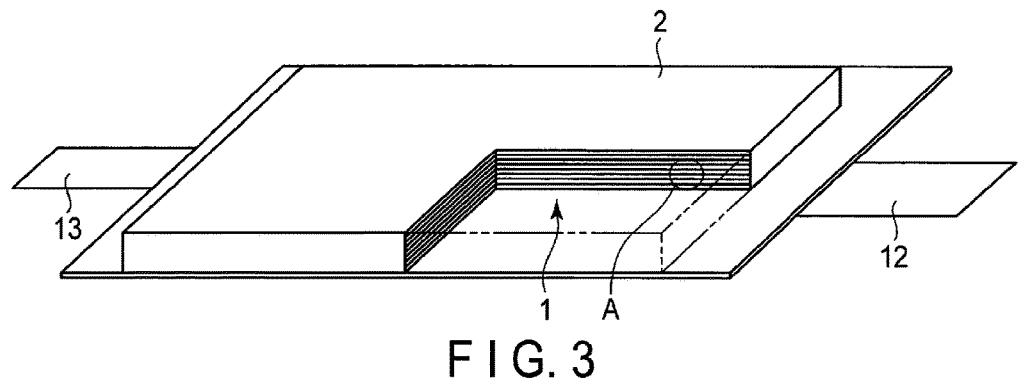
FIG. 3 is a partially cut-out perspective view showing a secondary battery according to an embodiment.
Figure 4:
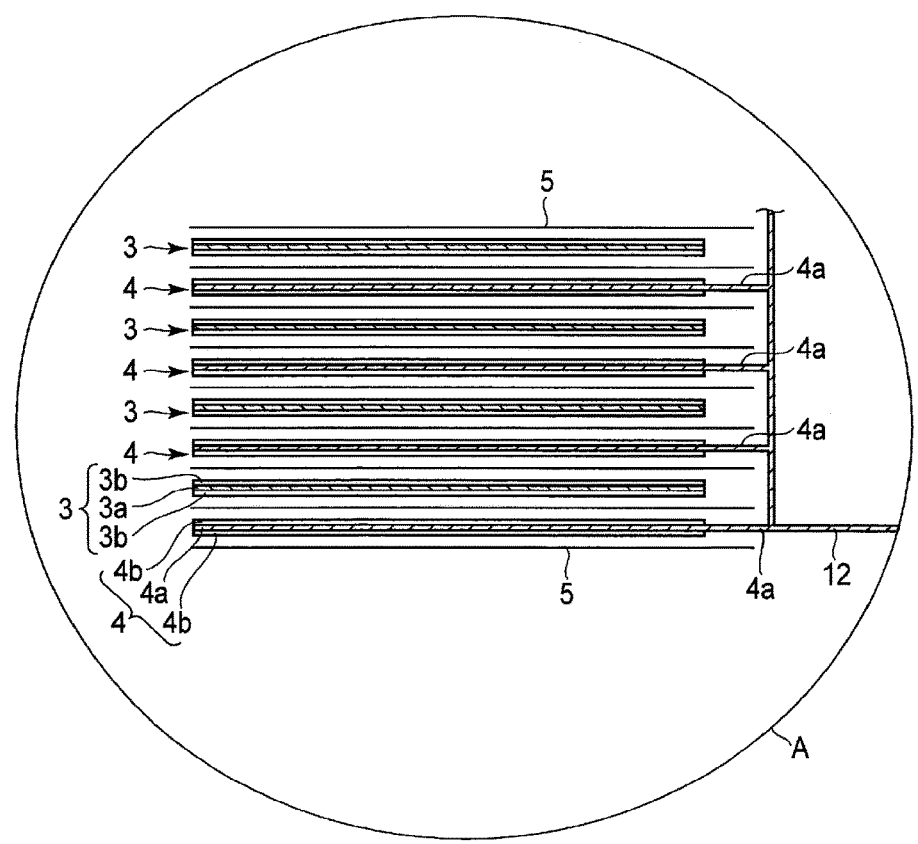
FIG. 4 is an enlarged cross-sectional view showing portion A of FIG. 3.

One example of a lithium secondary battery using a container member formed from the laminate film is shown in FIG. 3 and FIG. 4.

A stacked electrode group 1 is housed in a bag-like container 2. The bag-like container 2 is made of a laminate film where a metal layer is sandwiched between two resin films. As shown in FIG. 4, the stacked electrode group 1 has a structure in which positive electrodes 3 and negative electrodes 4 are alternately stacked with a separator 5 sandwiched therebetween. The electrode group 1 includes plural positive electrodes 3. Each of the plural positive electrodes 3 includes a current collector 3a, and positive electrode active material-including layers 3b formed on both of reverse surfaces of the positive electrode current collector 3a. The electrode group 1 includes plural negative electrodes 4. Each of the plural negative electrodes 4 includes a current collector 4a, and negative electrode active material-including layers 4b formed on both of reverse surfaces of the current collector 4a. An end of the current collector 4a of each of the negative electrodes 4 protrudes out from the positive electrodes 3. The protruded current collector 4a is electrically connected to a belt-shaped negative electrode terminal 12. The distal end of the belt-shaped negative electrode terminal 12 is extended out from the container 2.

Although not shown in the drawings, an end of the current collector 3a of the positive electrode 3 protrudes from the electrodes 4 at the side opposed to the protruded end of the current collector 4a. The current collectors 3a protruding from the negative electrodes 4 is electrically connected to a belt-shaped positive electrode terminal 13. The distal end of the belt-shaped positive electrode terminal 13 is positioned on the opposite side from the negative electrode terminal 12, and extended out from a side of the container 2.

In the lithium secondary battery shown in FIG. 1 to FIG. 4, there may be provided a safety valve for releasing hydrogen gas that has generated within the container to the outside. As the safety valve, either one of a return type valve, which operates when an internal pressure becomes higher than a pre-determined value and functions as a sealing plug when the internal pressure is reduced, and a non-return type valve, which does not recover its function as the sealing plug once it is operated, can be used. Although the lithium secondary batteries shown in FIG. 1 to FIG. 4 are sealed batteries, an open type battery is possible, in the case that a circulation system for converting hydrogen gas into water is included.

According to the embodiment, as described above, there is provided a lithium secondary battery including a positive electrode, a negative electrode, and an electrolyte solution, in which the negative electrode includes a negative electrode current collector and a negative electrode layer disposed on the negative electrode current collector, where the negative electrode current collector includes elemental zinc, and the negative electrode layer includes a negative electrode active material, the negative electrode active material including at least one compound selected from the group consisting of an oxide of titanium, a lithium-titanium oxide, and a lithium-titanium composite oxide, and in which the electrolyte solution includes an aqueous solvent and an electrolyte. By virtue of such a structure, there can be provided a lithium secondary battery that has high energy density, is excellent in charge and discharge efficiency and life performance, is inexpensive, and has high safety.

Second Embodiment

According to a second embodiment, a battery module including a secondary battery as a unit cell is provided. As the secondary battery, a lithium secondary battery of the first embodiment may be used.

Examples of the battery module include a battery module including unit cells as structural units, each being electrically connected to each other in series or in parallel, a battery module including a unit structured by plural unit cells that are electrically connected in series or a unit structured by plural unit cells that are electrically connected in parallel, and the like.

The battery module may be housed in a housing. As the housing, a metal can formed of aluminum alloy, iron, stainless steel, zinc, or the like, or a plastic container, or the like may be used. The container desirably has a wall thickness of 0.5 mm or more.

Examples of the aspect in which the plural secondary batteries are electrically connected in series or in parallel include an aspect in which the plural secondary batteries each has a container and are electrically connected in series or in parallel, and an aspect in which plural electrode groups are housed in the same housing and are electrically connected in series or in parallel. Specific examples of the former are those in which positive electrode terminals and negative electrode terminals of plural secondary batteries are connected via metal bus bars (for example, aluminum, nickel, or copper). Specific examples of the latter include an aspect in which plural electrode groups are housed in one housing in a state of being electrochemically insulated from each other by partitions, and these electrode groups are electrically connected to each other in series. When the number of batteries that are electrically connected in series is in a range of 5 to 7, voltage compatibility with a lead storage battery becomes good. In order to further increase the voltage compatibility with the lead storage battery, a structure in which 5 or 6 unit cells are connected in series is preferable.

One example of the battery module is explained with reference to FIG. 5.

A battery module 31, shown in FIG. 5, includes plural square-type lithium secondary batteries $32_1$ to $32_5$ according to the first embodiment (for example, FIG. 1 or FIG. 2) as unit cells. A positive electrode conductive tab 8 of battery $32_1$ and a negative electrode conductive tab 9 of battery $32_2$ positioned adjacent thereto, are electrically connected through a lead 33. Further, a positive electrode conductive tab 8 of the battery $32_2$ and a negative electrode conductive tab 9 of battery $32_3$ positioned adjacent thereto, are electrically connected through a lead 33. In this manner, the batteries $32_1$ to $32_5$ are connected in series.

According to the battery module of the second embodiment, by including the lithium secondary battery according to the first embodiment, there can be provided a battery module that has high energy density, is excellent in charge and discharge efficiency and life performance, is inexpensive, and has high safety.

Third Embodiment

According to a third embodiment, a battery pack is provided. The battery pack includes the lithium secondary battery according to the first embodiment.

The battery pack according to the third embodiment may include one or more lithium secondary batteries (unit cells) according to the first embodiment described above. The plural lithium secondary batteries, which may be included in the battery pack according to the third embodiment, may be electrically connected to each other in series, in parallel or in a combination of in series and in parallel. The plural lithium secondary batteries may be electrically connected to compose a battery module. In the case of composing a battery module from plural secondary batteries, the battery module according to the second embodiment may be used.

The battery pack according to the third embodiment may further include a protective circuit. The protective circuit has a function of controlling the charge and discharge of the lithium secondary battery. Alternatively, a circuit included in equipment that uses the battery pack as a power source (for example, an electronic device, a vehicle such as an automobile, or the like) may be used as the protective circuit of the battery pack.

Moreover, the battery pack according to the third embodiment may further include an external power distribution terminal. The external power distribution terminal is configured to externally output current from the lithium secondary battery and/or to input current into a unit cell 51. In other words, when the battery pack is used as a power source, the current is externally provided through the external power distribution terminal 59. When the battery pack is charged, the charge current (including a regenerative energy of a power of a vehicle such as an automobile, or the like) is provided to the battery pack through the external power distribution terminal.

An example of the battery pack according to the third embodiment is explained with reference to FIG. 6. FIG. 6 is a schematic perspective view showing one example of the battery packs.

A battery pack 40 includes a battery module including the secondary battery shown in FIG. 3 or 4. The battery pack 40 includes a housing 41, and a battery module 42 housed in the housing 41. In the battery module 42, plural (for example, 5) secondary batteries $43_1$ to $43_5$ are electrically connected in series. The secondary batteries $43_1$ to $43_5$ are stacked in a thickness direction. The housing 41 has an opening 44 on each of a upper portion and 4 side surfaces. The side surfaces, from which the positive and negative electrode terminals 12 and 13 of the secondary batteries $43_1$ to $43_5$ protrude, are exposed through the opening 44 of the housing 41. A positive electrode terminal 45 for output of the battery module 42 is belt-shaped, and one end thereof is electrically connected to any or all of the positive electrode terminals 12 of the secondary batteries $43_1$ to $43_5$, and the other end protrudes beyond the opening 44 of the housing 41 and thus protrudes from the upper portion of the housing 41. On the other hand, a negative electrode terminal 46 for output of the battery module 42 is belt-shaped, and one end thereof is electrically connected to any or all of the negative electrode terminals 13 of the secondary batteries $43_1$ to $43_5$, and the other end protrudes beyond the opening 44 of the housing 41 and thus protrudes from the upper portion of the housing 41.

Another example of the battery pack according to the third embodiment is explained in detail with reference to FIG. 7 and FIG. 8. FIG. 7 is an exploded perspective view showing another example of the battery pack according to the third embodiment. FIG. 8 is a block diagram showing an electric circuit of the battery pack in FIG. 7.

Plural unit cells 51, i.e. flat-type secondary batteries, are stacked such that externally extending negative electrode terminals 52 and positive electrode terminals 53 are arranged in the same direction, and the resulting stack is fastened with an adhesive tape 54 to form a battery module 55. The unit cells 51 are electrically connected to each other in series, as shown in FIG. 8.

A printed wiring board 56 is disposed facing the side surfaces of the unit cells 51 from which the negative electrode terminals 52 and the positive electrode terminals 53 extend out. A thermistor 57, a protective circuit 58, and an external power distribution terminal 59 are mounted on the printed wiring board 56, as shown in FIG. 8. An electric insulating plate (not shown) is attached to the surface of the printed wiring board 56 facing the battery module 55 to avoid unnecessary connection with wirings of the battery module 55.

A positive electrode lead 60 is connected to a positive electrode terminal 53 located at the lowermost layer of the battery module 55, and the distal end of the lead 60 is inserted into a positive electrode connector 61 on the printed wiring board 56 and thus electrically connected to the connector. A negative electrode lead 62 is connected to a negative electrode terminal 52 located at the uppermost layer of the battery module 55, and the distal end of the lead 62 is inserted into a negative electrode connector 63 on the printed wiring board 56 and thus electrically connected to the connector. The connectors 61 and 63 are connected to the protective circuit 58 through wirings 64 and 65 formed on the printed wiring board 56.

The thermistor 57 detects the temperature of the unit cells 51, and the detection signals are sent to the protective circuit 58. The protective circuit 58 can shut down a plus wiring 66a and a minus wiring 66b between the protective circuit 58 and the external power distribution terminal 59 under predetermined conditions. A predetermined condition is, for example, the case where the temperature detected by the thermistor 57 becomes a predetermined temperature or higher. Another example of the predetermined condition is the case when the over-charge, over-discharge or over-current of the unit cells 51 is detected. The detection of the over-charge, or the like, is performed for each individual unit cell 51 or for the battery module 55. When each individual unit cell 51 is detected, the battery voltage may be detected, or the positive electrode potential or negative electrode potential may be detected. In the latter case, a lithium electrode, which is used as a reference electrode, is inserted into each individual unit cell 51. In the case of FIG. 7 and FIG. 8, a wiring 67 for voltage detection is connected to each of the unit cells 51, and the detected signals are sent to the protective circuit 58 through the wirings 67.

Protective sheets 68, made of rubber or resin, are arranged on three side planes of the battery module 55 except for the side plane from which the positive electrode terminals 53 and the negative electrode terminals 52 protrude out.

The battery module 55 is housed in a housing container 69 together with the protective sheets 68 and the printed wiring board 56. That is, the protective sheets 68 are arranged on both internal surfaces in a long side direction and one internal surface in a short side direction of the housing container 69, and the printed wiring board 56 is disposed on the internal surface on the opposite side in the short side direction. The battery module 55 is located in a space surrounded by the protective sheets 68 and the printed wiring board 56. A lid 70 is attached to the upper surface of the housing container 69.

In order to fix the battery module 55, a heat-shrinkable tape may be used instead of the adhesive tape 54. In such a case, the battery module is fastened by placing the protective sheets on both side surfaces of the battery module, revolving the heat-shrinkable tape around the battery module, and thermally shrinking the heat-shrinkable tape.

In FIGS. 7 and 8, an aspect has been shown in which the unit cells 51 are connected in series; however, in order to increase the battery capacity, the cells may be connected in parallel. Alternatively, the connection in series and the connection in parallel may be combined. Furthermore, assembled battery packs may be connected to each other in series and/or in parallel.

In addition, although the battery pack shown in FIGS. 7 and 8 include plural unit cells 51, the battery pack according to the third embodiment may include only one unit cell 51.

The aspect of the battery pack may be appropriately changed depending on the application thereof. The battery pack can be suitably used in applications in which cycle performance is demanded to be excellent when large current is taken out. Specifically the battery pack may be used, for example, as a power source of a digital camera, as a battery for installing in a vehicle such as a two- or four-wheeled hybrid electric automobile, a two- or four-wheeled electric automobile, a power-assisted bicycle, or a rail way car, or as a stationary battery. In particular, the battery pack is suitably used for a battery installed in a vehicle.

In a vehicle onto which the battery pack according to the third embodiment has been installed, the battery pack is configured, for example, to recover regenerative energy from power of the vehicle.

According to the battery pack of the third embodiment described above, by including the lithium secondary battery according to the first embodiment, there can be provided a battery pack that has high energy density, is excellent in charge and discharge efficiency and life performance, is inexpensive, and has high safety.

Fourth Embodiment

According to a fourth embodiment, a vehicle is provided. The battery pack according to the third embodiment is installed on this vehicle.

In the vehicle according to the fourth embodiment, the battery pack is configured, for example, to recover regenerative energy from power of the vehicle.

Examples of the vehicle according to the fourth embodiment include two to four-wheeled hybrid electric automobiles, two to four-wheeled electric automobiles, electric assist bicycles, and rail way cars.

In the vehicle according to the fourth embodiment, the installing position of the battery pack is not particularly limited. For example, the battery pack may be installed in the engine compartment of the vehicle, in rear parts of the vehicle, or under seats.

An example of the vehicle according to the fourth embodiment is explained below, with reference to the drawings.

FIG. 9 is a cross-sectional view showing an example of a vehicle according to the fourth embodiment.

A vehicle 200, shown in FIG. 9 includes a vehicle body 201 and a battery pack 202. The battery pack 202 may be the battery pack according to the third embodiment.

The vehicle 200, shown in FIG. 9, is a four-wheeled automobile. As the vehicle 200, for example, a two- or four-wheeled hybrid electric automobile, a two- or four-wheeled electric automobile, an a power-assisted bicycle, or rail way car may be used.

The vehicle 200 may include plural battery packs 202. In that case, the battery packs 202 may be connected to each other in series or in parallel. The connection may be a combination of the connection in series and the connection in parallel.

The battery pack 202 is installed in an engine room located at the front of the vehicle body 201. The position at which the battery pack 202 is installed is not particularly limited. The battery pack 202 may be installed in rear sections of the vehicle body 201, or under a seat. The battery pack 202 may be used as a power source of the vehicle 200. The battery pack 202 can also recover regenerative energy of power of the vehicle 200.

Figure 10:
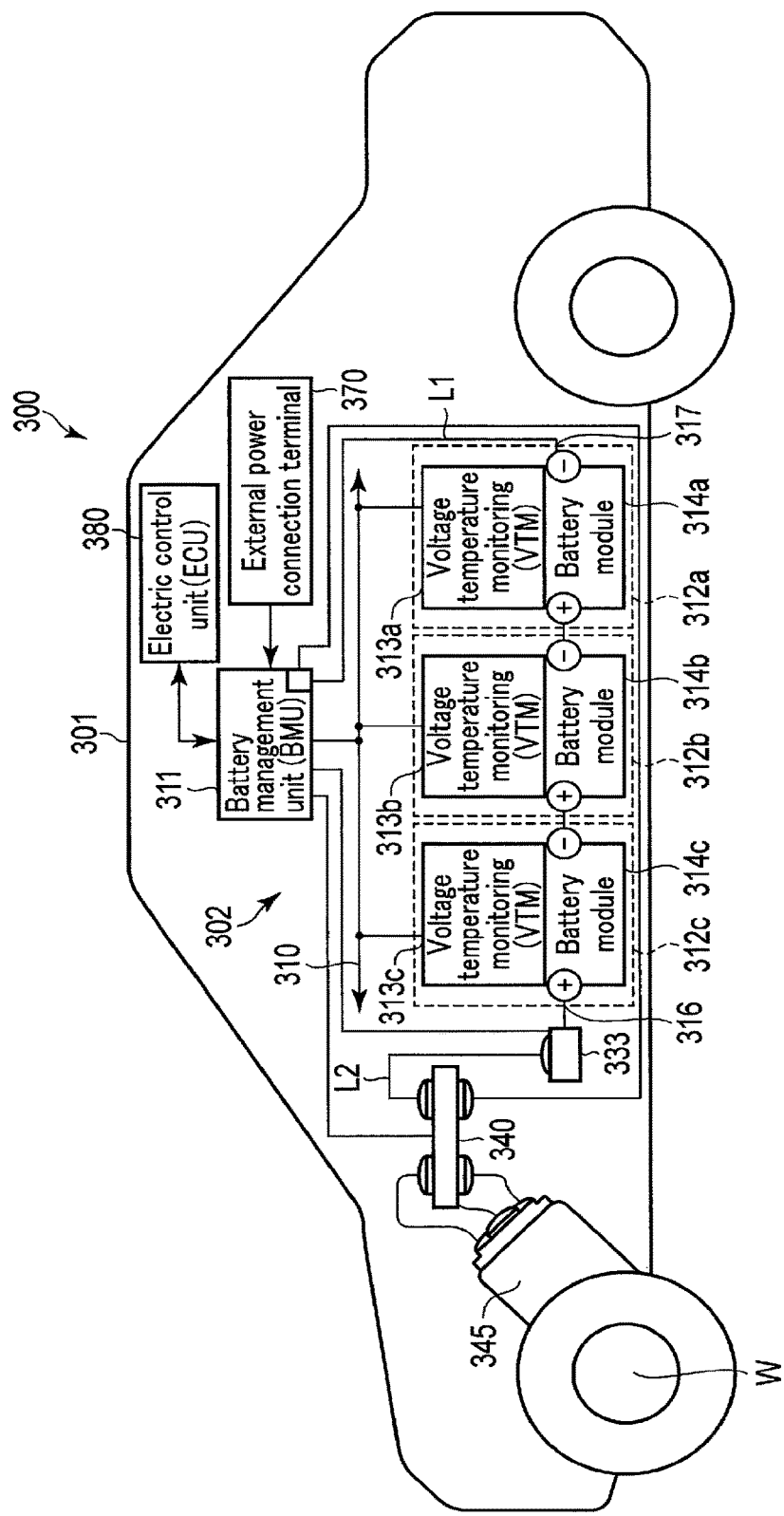
FIG. 10 is a schematic view showing another example of a vehicle according to an embodiment.

Next, with reference to FIG. 10, the vehicle according to the fourth embodiment is explained.

FIG. 10 is a view schematically showing another example of the vehicle according to the fourth embodiment. A vehicle 300, shown in FIG. 10, is an electric automobile.

The vehicle 300, shown in FIG. 10, includes a vehicle body 301, a vehicle power source 302, a vehicle ECU (electric control unit) 380, which is a master controller of the vehicle power source 302, an external terminal (an external power connection terminal) 370, an inverter 340, and a drive motor 345.

The vehicle 300 includes the vehicle power source 302, for example, in an engine room, in the rear sections of the automobile body, or under a seat. In FIG. 10, the position of the secondary battery installed in the vehicle 300 is schematically shown.

The vehicle power source 302 includes plural (for example, three) battery packs 312a, 312b and 312c, BMU (a battery management unit) 311, and a communication bus 310.

The three battery packs 312a, 312b and 312c are electrically connected to each other in series. The battery pack 312a includes a battery module 314a and a battery module monitoring unit (VTM: voltage temperature monitoring) 313a. The battery pack 312b includes a battery module 314b, and a battery module monitoring unit 313b. The battery pack 312c includes a battery module 314c, and a battery module monitoring unit 313c. The battery packs 312a, 312b and 312c can each be independently removed, and may be exchanged by a different battery pack 312.

Each of the battery modules 314a to 314c includes plural unit cells connected to each other in series. At least one of the plural unit cells is the secondary battery according to the first embodiment. The battery modules 314a to 314c each perform charging and discharging through a positive electrode terminal 316 and a negative electrode terminal 317.

In order to collect information concerning security of the vehicle power source 302, the battery management unit 311 performs communication among the battery module monitoring units 313a to 313c and collects information such as voltages or temperatures of the unit cells included in the battery modules 314a to 314c included in the vehicle power source 302.

The communication bus 310 is connected between the battery management unit 311 and the battery module monitoring units 313a to 313c. The communication bus 310 is configured so that multiple nodes (i.e., the battery management unit and one or more battery module monitoring units) share a set of communication lines. The communication bus 310 is, for example, a communication bus configured based on CAN (Control Area Network) standard.

The battery module monitoring units 313a to 313c measure a voltage and a temperature of each unit cell in the battery modules 314a to 314c based on communications from the battery management unit 311. It is possible, however, to measure the temperatures only at several points per battery module and the temperatures of all of the unit cells need not be measured.

The power source for vehicle 302 may also have an electromagnetic contactor (for example, a switch unit 333 shown in FIG. 10) for switching connection between the positive electrode terminal 316 and the negative electrode terminal 317. The switch unit 333 includes a precharge switch (not shown), which is turned on when the battery modules 314a to 314c are charged, and a main switch (not shown), which is turned on when battery output is supplied to a load. The precharge switch and the main switch include a relay circuit (not shown), which is turned on or off based on a signal supplied to a coil located near a switch element.

The inverter 340 converts an inputted DC (direct current) voltage to a three phase AC (alternate current) high voltage for driving a motor. A three phase output terminal of the inverter 340 is connected to each three phase input terminal of the drive motor 345. The inverter 340 controls an output voltage based on control signals from the battery management unit 311 or the vehicle ECU 380, which controls the whole operation of the vehicle.

The drive motor 345 is rotated by electric power supplied from the inverter 340. The rotation is transferred to an axle and driving wheels W, for example, through a differential gear unit.

The vehicle 300 also includes a regenerative brake mechanism, which is not shown though. The regenerative brake mechanism rotates the drive motor 345 when the vehicle 300 is braked, and converts kinetic energy to regenerative energy, which is electric energy. The regenerative energy, recovered in the regenerative brake mechanism, is inputted into the inverter 340 and converted to direct current. The direct current is inputted into the vehicle power source 302.

One terminal of a connecting line L1 is connected through a current detector (not shown) in the battery management unit 311 to the negative electrode terminal 317 of the vehicle power source 302. The other terminal of the connecting line L1 is connected to a negative electrode input terminal of the inverter 340.

One terminal of a connecting line L2 is connected through the switch unit 333 to the positive electrode terminal 316 of the vehicle power source 302. The other terminal of the connecting line L2 is connected to a positive electrode input terminal of the inverter 340.

The external terminal 370 is connected to the battery management unit 311. The external terminal 370 is able to connect, for example, to an external power source.

The vehicle ECU 380 cooperatively controls the battery management unit 311 together with other units in response to inputs operated by a driver or the like, thereby performing the management of the whole vehicle. Data concerning the security of the vehicle power source 302, such as a remaining capacity of the vehicle power source 302, are transferred between the battery management unit 311 and the vehicle ECU 380 through communication lines.

The vehicle according to the fourth embodiment includes the battery pack according to the third embodiment. The vehicle according to the fourth embodiment, therefore, has an excellent charge and discharge performance by virtue of including the battery pack having high energy density and excellent charge and discharge performance, and the vehicle has high reliability by virtue of the battery pack having excellent life performance. In addition, the vehicle is reduced in cost and can show a high safety.

EXAMPLES

Examples of the present disclosure are explained in detail below, with reference to the drawings, but the present disclosure is not limited to Examples shown below.

Example 1

<Production of Positive Electrode>

A lithium-manganese oxide ($LiMn_2O_4$) having a spinel structure and an average particle size of 10 µm as a positive electrode active material, a graphite powder as a conductive agent, and polyacrylimide (PAI) as a binder were used. The positive electrode active material, the conductive agent, and the binder were mixed in a proportion of 80% by weight, 10% by weight, and 10% by weight, respectively, and the mixture was dispersed in an NMP solvent to prepare a slurry. The prepared slurry was coated onto both of reverse surfaces of a Ti foil having a thickness of 12 µm as the positive electrode current collector, and the coat of applied slurry were dried to form positive electrode layers. The positive electrode current collector onto which the positive electrode layers were formed was subjected to pressing to produce a positive electrode having an electrode density of 3.0 g/cm³ (excluding the current collector).

<Production of Negative Electrode>

An $Li_4Ti_5O_{12}$ powder having an average secondary particle size (a diameter) of 15 µm as a negative electrode active material, a graphite powder as a conductive agent, and PAI as a binder were used. The negative electrode active material, the conductive agent, and the binder were mixed in proportions of 80% by weight, 10% by weight, and 10% by weight, respectively, and the mixture was dispersed in an NMP solvent to prepare a slurry. The obtained slurry was coated onto a Zn foil having a thickness 50 µm as the negative electrode current collector, and the coat of applied slurry was dried to form a negative electrode layer. When the slurry was coated onto the Zn foil, the slurry was coated onto one surface of the Zn foil for the portion which had become located on the outermost periphery of the electrode group in the produced negative electrode, and the slurry was coated onto both of reverse surfaces of the Zn foil for the other portions. The negative electrode current collector onto which the negative electrode layer was formed was subjected to pressing to produce a negative electrode having an electrode density of 2.0 g/cm³ (excluding the current collector).

<Production of Electrode Group>

The positive electrode produced as above, a non-woven separator formed of a cellulose fiber having a thickness of 20 µm, the negative electrode produced as above, and another non-woven separator were stacked in this order to obtain a stack. Next, the stack was spirally wound such that the negative electrode had become located at the outermost periphery to produce an electrode group. The electrode group was heat-pressed at 90° C. to produce a flat electrode group. The obtained electrode group was housed in a container, which was a thin metal can formed of stainless steel having a wall thickness of 0.25 mm. As the metal can, used was a can provided with a valve capable of releasing gas when the inner pressure reaches 2 atmospheric pressure or more.

<Preparation of Electrolyte Solution>

In one liter of water were dissolved 3M of LiCl and 0.25 M of $Li_2SO_4$ as electrolyte, into which 0.1 M of $ZnSO_4$ was further dissolved to obtain an aqueous solution. To the aqueous solution was added LiOH to adjust a pH value to 10.5 to prepare an alkaline electrolyte solution.

<Production of Lithium Secondary Battery and Initial Charge and Discharge>

The above prepared electrolyte solution was put into the container housing the electrode group to produce a lithium secondary battery having a structure shown in FIG. 1. After the electrolyte solution was put in, the lithium secondary battery was allowed to stand in a 25° C. environment for 24 hours. After that, the battery was subjected to initial charge and discharge in the 25° C. environment. In the initial charge and discharge, first, the battery was charged at a constant current of 5 A until a voltage reached 2.8 V, and then was discharged at a constant current of 1 A until the voltage reached 1.5 V. A capacity of the lithium secondary battery was examined upon initial charge and discharge.

The lithium secondary battery of Example 1 was produced as described above.

<Examining of Zinc-Including Coating Layer and Oxidized Zinc-Including Region>

First, according to the method described above, the presence of the second zinc-including coating layer was examined. Precipitation of a coating was identified from the SEM observation at 5000 times magnification, performed for the active material particles in the negative electrode. From the elemental analysis performed by EDX, it was identified that elemental zinc was included in the precipitated coating.

From the spectra obtained by the XPS measurement for the surface of the electrode, peaks assigned to elemental zinc, an oxide of zinc, and a hydroxide of zinc were detected. From the results of cross-sectional SEM-EDX for the negative electrode, presence of a coating layer having a thickness of 0.2 μm was identified on the surface of the negative electrode layer. From these results, it had been identified that, in the lithium secondary battery of Example 1, the second zinc-including coating layer having a thickness of 0.2 μm has formed on the negative electrode layer.

In addition, according to the procedures described above, the presence of the oxidized zinc-including region was examined. The batch of XPS spectra obtained by measuring the current collector surface while etching were analyzed by $SiO_2$ conversion. As a result, it was found that an oxide of zinc and a hydroxide of zinc were present in the current collector within a region from the outermost surface to a depth of 23 nm of the current collector. From the above, it was identified that, in the lithium secondary battery of Example 1, the oxidized zinc-including region having a thickness of 23 nm has formed on the negative electrode current collector.

Examples 2 to 15

Metals or compositions of alloys, used as the negative electrode current collector in Examples 2 to 15, are shown in Table 1 below. Compositions of compounds and electrolyte solutions, used for the negative electrode active material in Examples 2 to 15, are shown in Table 2 below. Further, for Examples 2 to 15, times of waiting from the insertion of the electrolyte solution into the container housing the electrode group until performing the initial charge and discharge, temperatures during the waiting, and current values for the initial charge are shown in Table 3 below.

Lithium secondary batteries of Examples 2 to 15 were produced in the same manner as in Example 1, except for the above noted conditions shown in Tables 1 to 3. In Examples 2 to 15, the presence of the second zinc-including coating layer and the oxidized zinc-including region, and the thicknesses thereof were examined by the same procedures as in Example 1. The results are shown in Table 3.

Example 16

In Example 16, a lithium secondary battery was produced in the same manner as in Example 1, except that an Al foil that had been plated with zinc and having a thickness of 30 μm was used as the negative electrode current collector, and the concentration of $ZnSO_4$ dissolved in the electrolyte solution was changed to 0.3 M. In Example 16, the presence of the second zinc-including coating layer and the oxidized zinc-including region, and the thicknesses thereof were examined by the same procedures as in Example 1. The results are shown in Table 3.

Further, in order to examine the oxidized zinc-including region, the negative electrode current collector was subjected to the cross-sectional SEM-EDX measurement when the negative electrode layer was dislodged from the negative electrode current collector, and the thickness of the zinc plating layer, i.e., the first zinc-including coating layer was examined. As shown in Table 1, the negative electrode current collector of Example 16 had a zinc-including coating layer having a thickness of 1 μm.

Examples 17 to 25

Lithium secondary batteries of Examples 17 to 25 were produced in the same manner as in Example 16, except that a metal or alloy foil plated with zinc shown in Table 1 was used as the negative electrode current collector. In Examples 17 to 24, the presence of the first and second zinc-including coating layer and the oxidized zinc-including region, and the thicknesses thereof were examined by the same procedures as in Example 16. The results concerning the first zinc-including coating layer are shown in Table 1, and the results concerning the second zinc-including coating layer and the oxidized zinc-including region are shown in Table 3.

Comparative Examples 1 to 4

Metals or alloys, used as the negative electrode current collector in Comparative Examples 1 to 4, are shown in Table 1, and compounds and compositions of electrolyte solutions, used for the negative electrode active material, are shown in Table 2. Lithium secondary batteries of Comparative Examples 1 to 4 were produced in the same manner as in Example 1 except for the condition described above. Note however, that a large amount of gas had generated inside the battery in Comparative Examples 1 and 2 at the initial charge, and thus the charge and discharge was interrupted and the battery could not be completed. In order to examine the presence of the second zinc-including coating layer and the oxidized zinc-including region, the same procedures as in Example 1 were repeated, but neither presence of the zinc-including coating layer or of the oxidized zinc-including region could be identified in Comparative Examples 1 to 4.

TABLE 1

|  | Composition of negative electrode current collector foil (atom %) | Composition of first zinc-including coating layer (atom %) | Thickness of first zinc-including coating layer |
|---|---|---|---|
| Example 1 | Zn | — | — |
| Example 2 | Zn/Al (50/50) | — | — |
| Example 3 | Zn/Al (60/40) | — | — |
| Example 4 | Zn/Al (60/40) | — | — |
| Example 5 | Zn/Al/Pb (50/40/10) | — | — |
| Example 6 | Zn/Ti/Sn/Bi (70/25/4/1) | — | — |
| Example 7 | Zn/Ti/Sn/Pb/Tl/In/Ga (80/15/2/1.5/0.5/0.5/0.5) | — | — |
| Example 8 | Zn/Ti (80/20) | — | — |

TABLE 1-continued

|  | Composition of negative electrode current collector foil (atom %) | Composition of first zinc-including coating layer (atom %) | Thickness of first zinc-including coating layer |
|---|---|---|---|
| Example 9 | Zn | — | — |
| Example 10 | Zn | — | — |
| Example 11 | Zn | — | — |
| Example 12 | Zn | — | — |
| Example 13 | Zn | — | — |
| Example 14 | Zn/Al (30/70) | — | — |
| Example 15 | Zn | — | — |
| Example 16 | Al | Zn | 1 μm |
| Example 17 | Al | Zn | 0.1 μm |
| Example 18 | Al | Zn | 10 μm |
| Example 19 | Al | Zn | 0.2 μm |
| Example 20 | Al | Zn | 5 μm |
| Example 21 | Ti | Zn/Al (50/50) | 1.3 μm |
| Example 22 | Cu/Ni (80/20) | Zn/Al (60/40) | 3.0 μm |
| Example 23 | Cu | Zn/Ti/Sn/Bi (70/25/4/1) | 3.0 μm |
| Example 24 | Fe | Zn/Ti/Sn/Bi (70/25/4/1) | 3.0 μm |
| Example 25 | Ti | Zn/Ti/Sn/Pb/Tl/In/Ga (80/15/2/1.5/0.5/0.5/0.5) | 3.0 μm |
| Comparative Example 1 | Ti | — | — |
| Comparative Example 2 | Fe (SUS) | — | — |
| Comparative Example 3 | Ti | — | — |
| Comparative Example 4 | Fe (SUS) | — | — |

TABLE 2

|  | Negative electrode active material | Electrolyte solution |
|---|---|---|
| Example 1 | $Li_4Ti_5O_{12}$ | LiCl 3.5M/$Li_2SO_4$ 0.25M/$ZnSO_4$ 0.1M/(LiOH) |
| Example 2 | $Li_4Ti_5O_{12}$ | LiCl 3.5M/$Li_2SO_4$ 0.25M/$ZnSO_4$ 0.1M/(LiOH) |
| Example 3 | $Li_4Ti_5O_{12}$ | LiCl 3.5M/$Li_2SO_4$ 0.25M/$ZnSO_4$ 0.1M/(LiOH) |
| Example 4 | $Li_4Ti_5O_{12}$ | LiCl 3.5M/$Li_2SO_4$ 0.25M/$ZnSO_4$ 0.1M/(LiOH) |
| Example 5 | $Li_4Ti_5O_{12}$ | LiCl 3.5M/$Li_2SO_4$ 0.25M/$ZnSO_4$ 0.1M/(LiOH) |
| Example 6 | $Li_4Ti_5O_{12}$ | LiCl 3.5M/$Li_2SO_4$ 0.25M/$ZnSO_4$ 0.1M/(LiOH) |
| Example 7 | $Li_4Ti_5O_{12}$ | LiCl 3.5M/$Li_2SO_4$ 0.25M/$ZnSO_4$ 0.1M/(LiOH) |
| Example 8 | $Li_4Ti_5O_{12}$/$TiO_2$ (rutile type) 80/20 (wt %) | LiCl 3.5M/$Li_2SO_4$ 0.25M/$ZnSO_4$ 0.1M/(LiOH) |
| Example 9 | $Li_4Ti_5O_{12}$ | LiCl 3.5M/$Li_2SO_4$ 0.25M/(LiOH) |
| Example 10 | $Li_4Ti_5O_{12}$ | LiCl 3.5M/$Li_2SO_4$ 0.25M/$ZnSO_4$ 0.5M/(LiOH) |
| Example 11 | $Li_4Ti_5O_{12}$ | LiCl 3.5M/$Li_2SO_4$ 0.25M/$ZnSO_4$ 0.1M/(LiOH) |
| Example 12 | $Li_4Ti_5O_{12}$ | LiCl 3.5M/$Li_2SO_4$ 0.25M/$ZnSO_4$ 0.1M/(LiOH) |
| Example 13 | $Li_4Ti_5O_{12}$ | LiCl 3.5M/$Li_2SO_4$ 0.25M/$ZnSO_4$ 0.1M/(LiOH) |
| Example 14 | $Li_4Ti_5O_{12}$ | LiCl 3.5M/$Li_2SO_4$ 0.25M/$ZnSO_4$ 0.1M/(LiOH) |
| Example 15 | $Li_4Ti_5O_{12}$ | LiCl 3.5M/$Li_2SO_4$ 0.25M/$ZnSO_4$ 0.1M/(LiOH) |
| Example 16 | $Li_4Ti_5O_{12}$ | LiCl 3.5M/$Li_2SO_4$ 0.25M/$ZnSO_4$ 0.3M/(LiOH) |
| Example 17 | $Li_4Ti_5O_{12}$ | LiCl 3.5M/$Li_2SO_4$ 0.25M/$ZnSO_4$ 0.3M/(LiOH) |
| Example 18 | $Li_4Ti_5O_{12}$ | LiCl 3.5M/$Li_2SO_4$ 0.25M/$ZnSO_4$ 0.3M/(LiOH) |
| Example 19 | $Li_4Ti_5O_{12}$ | LiCl 3.5M/$Li_2SO_4$ 0.25M/$ZnSO_4$ 0.3M/(LiOH) |
| Example 20 | $Li_4Ti_5O_{12}$ | LiCl 3.5M/$Li_2SO_4$ 0.25M/$ZnSO_4$ 0.3M/(LiOH) |
| Example 21 | $Li_4Ti_5O_{12}$ | LiCl 3.5M/$Li_2SO_4$ 0.25M/$ZnSO_4$ 0.3M/(LiOH) |
| Example 22 | $Li_4Ti_5O_{12}$ | LiCl 3.5M/$Li_2SO_4$ 0.25M/$ZnSO_4$ 0.3M/(LiOH) |
| Example 23 | $Li_4Ti_5O_{12}$ | LiCl 3.5M/$Li_2SO_4$ 0.25M/$ZnSO_4$ 0.3M/(LiOH) |
| Example 24 | $Li_4Ti_5O_{12}$ | LiCl 3.5M/$Li_2SO_4$ 0.25M/$ZnSO_4$ 0.3M/(LiOH) |
| Example 25 | $Li_4Ti_5O_{12}$ | LiCl 3.5M/$Li_2SO_4$ 0.25M/$ZnSO_4$ 0.3M/(LiOH) |
| Comparative Example 1 | $Li_4Ti_5O_{12}$ | LiCl 3.5M/$Li_2SO_4$ 0.25M/(LiOH) |
| Comparative Example 2 | $Li_4Ti_5O_{12}$ | LiCl 3.5M/$Li_2SO_4$ 0.25M/(LiOH) |

TABLE 2-continued

|  | Negative electrode active material | Electrolyte solution |
|---|---|---|
| Comparative Example 3 | $TiO_2$ (anatase type) | LiCl 3.5M/$Li_2SO_4$ 0.25M/(LiOH) |
| Comparative Example 4 | $LiV_2O_4$ | LiCl 3.5M/$Li_2SO_4$ 0.25M/(LiOH) |

TABLE 3

|  | Time and temperature of waiting after inserting electrolyte solution | Current value of initial charge | Thickness of oxidized zinc-including region | Thickness of second zinc-including coating layer |
|---|---|---|---|---|
| Example 1 | 24 Hr, 25° C. | 5 A | 23 nm | 0.20 μm |
| Example 2 | 24 Hr, 25° C. | 5 A | 5 nm | 0.12 μm |
| Example 3 | 24 Hr, 25° C. | 5 A | 10 nm | 0.16 μm |
| Example 4 | 48 Hr, 25° C. | 10 A | 18 nm | 0.48 μm |
| Example 5 | 24 Hr, 25° C. | 5 A | 12 nm | 0.13 μm |
| Example 6 | 24 Hr, 25° C. | 5 A | 14 nm | 0.08 μm |
| Example 7 | 24 Hr, 25° C. | 5 A | 13 nm | 0.11 μm |
| Example 8 | 24 Hr, 25° C. | 5 A | 15 nm | 0.17 μm |
| Example 9 | 2 Hr, 25° C. | 15 A | 5 nm | 0.01 μm |
| Example 10 | 48 Hr, 45° C. | 1 A | 100 nm | 0.50 μm |
| Example 11 | 24 Hr, 65° C. | 5 A | 50 nm | 0.45 μm |
| Example 12 | 24 Hr, 25° C. | 1 A | 10 nm | 0.35 μm |
| Example 13 | 24 Hr, 25° C. | 10 A | 27 nm | 0.01 μm |
| Example 14 | 24 Hr, 25° C. | 5 A | 2 nm | 0.01 μm |
| Example 15 | 48 Hr, 65° C. | 1 A | 1 μm | 0.48 μm |
| Example 16 | 24 Hr, 25° C. | 5 A | 32 nm | 0.25 μm |
| Example 17 | 24 Hr, 25° C. | 5 A | 22 nm | 0.17 μm |
| Example 18 | 24 Hr, 25° C. | 5 A | 23 nm | 0.28 μm |
| Example 19 | 24 Hr, 25° C. | 5 A | 21 nm | 0.22 μm |
| Example 20 | 24 Hr, 25° C. | 5 A | 23 nm | 0.18 μm |
| Example 21 | 24 Hr, 25° C. | 5 A | 12 nm | 0.13 μm |
| Example 22 | 24 Hr, 25° C. | 5 A | 16 nm | 0.18 μm |
| Example 23 | 24 Hr, 25° C. | 5 A | 15 nm | 0.22 μm |
| Example 24 | 24 Hr, 25° C. | 5 A | 12 nm | 0.18 μm |
| Example 25 | 24 Hr, 25° C. | 5 A | 13 nm | 0.14 μm |
| Comparative Example 1 | 24 Hr, 25° C. | 5 A | — | — |
| Comparative Example 2 | 24 Hr, 25° C. | 5 A | — | — |
| Comparative Example 3 | 24 Hr, 25° C. | 5 A | — | — |
| Comparative Example 4 | 24 Hr, 25° C. | 5 A | — | — |

<Evaluation of Average Operating Voltage>

An average operating voltage of each of the lithium secondary batteries of Examples 1 to 25 and Comparative Examples 1 to 4, obtained when the battery was subjected to the initial charge and discharge, is shown in Table 4 below.

TABLE 4

|  | Average operating voltage | Charge and discharge efficiency at 50th cycle |
|---|---|---|
| Example 1 | 2.45 V | 96% |
| Example 2 | 2.42 V | 90% |
| Example 3 | 2.46 V | 92% |
| Example 4 | 2.43 V | 95% |
| Example 5 | 2.42 V | 94% |
| Example 6 | 2.46 V | 96% |
| Example 7 | 2.43 V | 97% |
| Example 8 | 2.35 V | 99% |
| Example 9 | 2.43 V | 89% |
| Example 10 | 2.30 V | 99% |
| Example 11 | 2.40 V | 95% |
| Example 12 | 2.44 V | 93% |
| Example 13 | 2.43 V | 91% |
| Example 14 | 2.45 V | 90% |
| Example 15 | 2.20 V | 98% |
| Example 16 | 2.41 V | 96% |
| Example 17 | 2.43 V | 90% |
| Example 18 | 2.43 V | 98% |
| Example 19 | 2.45 V | 95% |
| Example 20 | 2.43 V | 97% |
| Example 21 | 2.44 V | 96% |
| Example 22 | 2.42 V | 94% |
| Example 23 | 2.43 V | 95% |
| Example 24 | 2.44 V | 93% |
| Example 25 | 2.45 V | 95% |
| Comparative Example 1 | *Could not be charged and discharged due to gas generation at negative electrode | — |
| Comparative Example 2 | *Could not be charged and discharged due to gas generation at negative electrode | — |
| Comparative Example 3 | 2.10 V | 88% |
| Comparative Example 4 | 1.50 V | 96% |

In Comparative Examples 1 and 2, in which the lithium-titanium oxide $Li_4Ti_5O_{12}$ as the negative electrode active material was combined with the negative electrode current collector made of metal or alloy foil including no zinc element, there was vigorous gas generation from the negative electrode, and consequently the initial charge and discharge could not be completed, as described above. For that reason, an average operating voltage could not be obtained.

On the other hand, in Comparative Examples 3 and 4, in which a different negative electrode active material was combined with the negative electrode current collector including no zinc element, the lithium secondary battery had an average operating voltage lower than the average operating voltages obtained in the lithium secondary batteries of Examples 1 to 25, in which the negative electrode active material including $Li_4Ti_5O_{12}$ was used. In particular, the lithium secondary battery of Comparative Example 4, in which $LiV_2O_4$ including no titanium was used as the negative electrode active material, had a significantly low average operating voltage.

<Evaluation of Life Performance>

The lithium secondary batteries of Examples 1 to 25 and the lithium secondary batteries of Comparative Examples 3 and 4 were subjected to a cycle test as described below.

After the battery was charged at a constant current of 3 A in a 25° C. environment until the voltage reached 2.8 V, 30 minutes of resting time was provided, and then the battery was discharged until the voltage reached 1.5 V. After that, another 30 minutes of resting time was provided. One cycle of these procedures was defined as one charge and discharge cycle. The charge and discharge cycle was repeated 50 times. From a charge capacity and a discharge capacity at the 50th charge and discharge cycle, a charge and discharge efficiency (charge capacity/discharge capacity) was calculated. The results from the cycle test are shown in Table 4.

As shown in Table 4, in the lithium secondary batteries of Examples 1 to 25, even after the charge and discharge cycle was repeated 50 times, high charge and discharge efficiency was exhibited. In the lithium secondary battery of Comparative Example 3, the charge and discharge efficiency at the 50th cycle was lower than those in Examples 1 to 25.

Examples 26 to 38

As shown in Table 5 below, in Examples 26 to 38, a zinc metal foil was used as the negative electrode current collector. In addition, in Example 26 to 38, compounds having compositions shown in Table 6 below were used for the negative electrode active material, and electrolyte solutions of compositions shown in Table 6 below were used. Further, for Examples 26 to 38, times of waiting from the insertion of the electrolyte solution into the container housing the electrode group until performing the initial charge and discharge, temperatures during the waiting, and current values for the initial charge were set to conditions shown in Table 7 below.

Secondary batteries of Examples 26 to 38 were produced in the same manner as in Example 1, except for the conditions shown in Tables 5 to 7 below. In Examples 26 to 38, the presence of the second zinc-including coating layer and the oxidized zinc-including region, and the thicknesses thereof were examined by the same procedures as in Example 1. The results are shown in Table 7.

Example 39

A lithium-nickel-manganese-cobalt oxide (LiNi$_{0.33}$Co$_{0.33}$Mn$_{0.33}$O$_2$) having an average particle size of 8 μm as a positive electrode active material, a graphite powder as a conductive agent, and polyacrylimide (PAI) as a binder were used. The positive electrode active material, the conductive agent, and the binder were mixed in proportions of 80% by weight, 10% by weight, and 10% by weight, respectively, and the mixture was dispersed in an NMP solvent to prepare a slurry. The prepared slurry was coated onto both of reverse surfaces of a Ti foil having a thickness of 12 μm as the positive electrode current collector, and the coat of applied slurry were dried to form positive electrode layers. The positive electrode current collector having the positive electrode layers formed thereon was subjected to pressing to produce a positive electrode having an electrode density of 3.1 g/cm$^3$ (excluding the current collector). A secondary battery was produced in the same manner as in Example 27 except for the above.

Example 40

A lithium iron phosphate (LiFePO$_4$) having an average particle size of 5 μm as a positive electrode active material, a graphite powder as a conductive agent, and polyacrylimide (PAI) as a binder were used. The positive electrode active material, the conductive agent, and the binder were mixed in proportions of 80% by weight, 10% by weight, and 10% by weight, respectively, and the mixture was dispersed in an NMP solvent to prepare a slurry. The prepared slurry was coated onto both of reverse surfaces of a Ti foil having a thickness of 12 μm as the positive electrode current collector, and the coat of applied slurry were dried to form positive electrode layers. The positive electrode current collector having the positive electrode layers formed thereon was subjected to pressing to produce a positive electrode having an electrode density of 2.2 g/cm$^3$ (excluding the current collector). A secondary battery was produced in the same manner as in Example 27 except for the above.

The materials used in the production of the secondary batteries of Examples 39 and 40, and the initial charge and discharge conditions of the battery are summarized in Tables 5 and 6, and Table 7, respectively together with those in Examples 26 to 38.

TABLE 5

|  | Composition of negative electrode current collector foil |
| --- | --- |
| Example 26 | Zn |
| Example 27 | Zn |
| Example 28 | Zn |
| Example 29 | Zn |
| Example 30 | Zn |
| Example 31 | Zn |
| Example 32 | Zn |
| Example 33 | Zn |
| Example 34 | Zn |
| Example 35 | Zn |
| Example 36 | Zn |
| Example 37 | Zn |
| Example 38 | Zn |
| Example 39 | Zn |
| Example 40 | Zn |

TABLE 6

|  | Negative electrode active material | Electrolyte solution |
| --- | --- | --- |
| Example 26 | Li$_4$Ti$_5$O$_{12}$ | LiCl 6M/ZnCl$_2$ 0.1M |
| Example 27 | Li$_4$Ti$_5$O$_{12}$ | LiCl 8M/ZnCl$_2$ 0.1M |
| Example 28 | Li$_4$Ti$_5$O$_{12}$ | LiCl 10M/ZnCl$_2$ 0.1M |
| Example 29 | Li$_4$Ti$_5$O$_{12}$ | LiCl 12M/ZnCl$_2$ 0.1M |
| Example 30 | Li$_4$Ti$_5$O$_{12}$ | LiCl 13M/ZnCl$_2$ 0.1M |
| Example 31 | Li$_4$Ti$_5$O$_{12}$ | Li$_2$NO$_3$ 9M/LiCl 0.1M |
| Example 32 | Li$_4$Ti$_5$O$_{12}$ | LiBETA 2.5M |
| Example 33 | Li$_4$Ti$_5$O$_{12}$ | LiTFSA 5M |
| Example 34 | Li$_4$Ti$_5$O$_{12}$ | LiTFSA 8M |
| Example 35 | Li$_4$Ti$_5$O$_{12}$ | LiTFSA 2M |
| Example 36 | TiO$_2$(anatase type) | LiCl 10M/ZnCl$_2$ 0.1M |
| Example 37 | TiNb$_2$O$_7$ | LiCl 10M/ZnCl$_2$ 0.1M |
| Example 38 | Li$_2$Na$_{1.8}$Ti$_{5.8}$Nb$_{0.2}$O$_{14}$ | LiCl 10M/ZnCl$_2$ 0.1M |
| Example 39 | Li$_4$Ti$_5$O$_{12}$ | LiCl 8M/ZnCl$_2$ 0.1M |
| Example 40 | Li$_4$Ti$_5$O$_{12}$ | LiCl 8M/ZnCl$_2$ 0.1M |

TABLE 7

|  | Time and temperature of waiting after inserting electrolyte solution | Current value of initial charge | Thickness of oxidized zinc-including region | Thickness of second zinc-including coating layer |
| --- | --- | --- | --- | --- |
| Example 26 | 36 Hr, 25° C. | 5 A | 6 nm | 0.15 μm |
| Example 27 | 40 Hr, 25° C. | 5 A | 8 nm | 0.18 μm |
| Example 28 | 36 Hr, 35° C. | 5 A | 7 nm | 0.25 μm |
| Example 29 | 30 Hr, 45° C. | 5 A | 10 nm | 0.14 μm |
| Example 30 | 24 Hr, 35° C. | 5 A | 10 nm | 0.26 μm |
| Example 31 | 36 Hr, 25° C. | 5 A | 13 nm | 0.24 μm |
| Example 32 | 48 Hr, 65° C. | 5 A | 2 nm | 0.01 μm |
| Example 33 | 48 Hr, 65° C. | 5 A | 1 nm | 0.01 μm |
| Example 34 | 48 Hr, 65° C. | 5 A | 0.8 nm | 0.01 μm |

TABLE 7-continued

|  | Time and temperature of waiting after inserting electrolyte solution | Current value of initial charge | Thickness of oxidized zinc-including region | Thickness of second zinc-including coating layer |
|---|---|---|---|---|
| Example 35 | 48 Hr, 65° C. | 5 A | 5 nm | 0.06 μm |
| Example 36 | 36 Hr, 35° C. | 5 A | 7 nm | 0.25 μm |
| Example 37 | 48 Hr, 65° C. | 5 A | 35 nm | 0.42 μm |
| Example 38 | 48 Hr, 65° C. | 5 A | 62 nm | 0.48 μm |
| Example 39 | 40 Hr, 25° C. | 5 A | 8 nm | 0.18 μm |
| Example 40 | 40 Hr, 25° C. | 5 A | 8 nm | 0.18 μm |

<Evaluation of Average Operating Voltage>

An average operating voltage of each of the secondary batteries of Examples 26 to 40, obtained when the battery was subjected to the initial charge and discharge, is shown in Table 8 below.

TABLE 8

|  | Average operating voltage | Charge and discharge efficiency at 50th cycle |
|---|---|---|
| Example 26 | 2.45 V | 97% |
| Example 27 | 2.46 V | 97% |
| Example 28 | 2.47 V | 99% |
| Example 29 | 2.43 V | 96% |
| Example 30 | 2.43 V | 92% |
| Example 31 | 2.43 V | 90% |
| Example 32 | 2.46 V | 88% |
| Example 33 | 2.41 V | 87% |
| Example 34 | 2.43 V | 86% |
| Example 35 | 2.46 V | 86% |
| Example 36 | 2.22 V | 97% |
| Example 37 | 2.41 V | 91% |
| Example 38 | 2.65 V | 87% |
| Example 39 | 2.35 V | 95% |
| Example 40 | 1.83 V | 94% |

As shown in Table 8, the secondary batteries according to Example 26 to 40 each exhibited an average operating voltage that was close to those of the lithium secondary batteries of Examples 1 to 25.

<Evaluation of Life Performance>

The secondary batteries of Examples 26 to 40 were subjected to a cycle test in a similar manner as in Examples 1 to 25. The results from the cycle test are shown in Table 8.

As shown in Table 8, in the secondary batteries of Examples 26 to 31 and 36 to 40, even after the charge and discharge cycle was repeated 50 times, high charge and discharge efficiency was exhibited, as in Examples 1 to 25. In the secondary batteries of Examples 32 to 35, the charge and discharge efficiency at the 50th cycle was lower than those in Examples 1 to 31 and 36 to 40. It can be supposed that this is due to the thickness of the second zinc-including coating layer becoming thinner, as shown in Table 7, resulting from the reduced molar ratio of the water, which was used as the solvent, caused by the use of a high concentration of the amide support salt as the electrolyte in the electrolyte solution.

According to at least one embodiment described above, there is provided a secondary battery including a positive electrode, a negative electrode, and an electrolyte solution, in which the negative electrode includes a negative electrode current collector and a negative electrode layer disposed on the negative electrode current collector, where the negative electrode current collector includes elemental zinc, and the negative electrode layer includes a negative electrode active material, the negative electrode active material including at least one compound selected from the group consisting of an oxide of titanium, a lithium-titanium oxide, and a lithium-titanium composite oxide, and in which the electrolyte solution includes an aqueous solvent and an electrolyte. By virtue of having such a structure, the secondary battery has high energy density, is excellent in charge and discharge efficiency and life performance, is inexpensive, and has high safety.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A secondary battery comprising:
    a positive electrode;
    a negative electrode including a negative electrode current collector and a negative electrode layer disposed on the negative electrode current collector, the negative electrode current collector including elemental zinc, and the negative electrode layer including a negative electrode active material that includes at least one compound selected from the group consisting of an oxide of titanium, a lithium-titanium oxide, and a lithium-titanium composite oxide; and
    an electrolyte solution including an aqueous solvent and an electrolyte wherein the negative electrode current collector further includes an oxidized zinc-including region in at least a part of a surface region thereof, the oxidized zinc-including region having a thickness of from 5 nm to 1 um and including at least one compound selected from the group consisting of an oxide of zinc, a hydroxide of zinc, and a basic zinc carbonate compound.

2. The secondary battery according to claim 1, wherein the negative electrode current collector includes, in at least a part of a surface region thereof, the elemental zinc at a proportion of 30 atom % or more in a depth region of up to 0.1 μm or more in a depth direction from a surface of the negative electrode current collector.

3. The secondary battery according to claim 2, wherein the negative electrode current collector includes a foil including the elemental zinc at a proportion of 30 atom % or more.

4. The secondary battery according to claim 2, wherein the negative electrode current collector includes a substrate and a first zinc-including coating layer disposed on at least a part of a surface of the substrate, the substrate including at least one metal selected from the group consisting of Al, Fe, Cu, Ni, and Ti, and the first zinc-including coating layer including elemental zinc at a proportion of 30 atom % or more, and having a thickness of 0.1 μm to 10 μm.

5. The secondary battery according to claim 3, wherein the negative electrode current collector includes at least one element selected from the group consisting of Ga, In, Bi, Tl, Sn, Pb, Ti, and Al.

6. The secondary battery according to claim 4, wherein the first zinc-including coating layer includes at least one element selected from the group consisting of Ga, In, Bi, Tl, Sn, Pb, Ti, and Al.

7. The secondary battery according to claim 1, wherein the negative electrode current collector includes, in at least a part of a surface region thereof, at least one compound selected from the group consisting of an oxide of zinc, a hydroxide of zinc, and a basic zinc carbonate compound in a depth region of up to 5 nm or more and 1 μm or less from a surface of the negative electrode current collector in the depth direction.

8. The secondary battery according to claim 1, wherein the negative electrode further includes a second zinc-including coating layer, the second zinc-including coating layer having a thickness of 0.01 μm to 0.5 μm and including at least one selected from the group consisting of elemental zinc, an oxide of zinc, a hydroxide of zinc, and a basic zinc carbonate compound.

9. The secondary battery according to claim 8, wherein the negative electrode layer includes particles of the negative electrode active material, and the second zinc-including coating layer is disposed on at least a part of surfaces of the particles of the negative electrode active material.

10. A battery pack comprising the secondary battery according to claim 1.

11. The battery pack according to claim 10 further comprising an external power distribution terminal and a protective circuit.

12. The battery pack according to claim 10 comprising a plural of the secondary batteries, the plural secondary batteries being electrically connected in series, in parallel, or in combination of in series and in parallel.

13. A vehicle comprising the battery pack according to claim 10.

14. The vehicle according to claim 13, wherein the battery pack is configured to recover a regenerative energy of power of the vehicle.

* * * * *